US012613877B2

(12) United States Patent
Paul et al.

(10) Patent No.: US 12,613,877 B2
(45) Date of Patent: Apr. 28, 2026

(54) USER INTERFACES FOR SEARCHING IN MESSAGES

(71) Applicant: Apple Inc., Cupertino, CA (US)

(72) Inventors: Grant R. Paul, San Francisco, CA (US); Christian X Dalonzo, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/732,069

(22) Filed: Jun. 3, 2024

(65) Prior Publication Data

US 2025/0005031 A1 Jan. 2, 2025

Related U.S. Application Data

(60) Provisional application No. 63/506,120, filed on Jun. 4, 2023.

(51) Int. Cl.
| | |
|---|---|
| *G06F 16/00* | (2019.01) |
| *G06F 16/248* | (2019.01) |
| *G06F 16/28* | (2019.01) |

(52) U.S. Cl.
CPC .......... *G06F 16/248* (2019.01); *G06F 16/287* (2019.01)

(58) Field of Classification Search
CPC ............................. G06F 16/248; G06F 16/287
USPC ................................................... 707/600–899
See application file for complete search history.

(56) References Cited

U.S. PATENT DOCUMENTS

| | | | |
|---|---|---|---|
| 6,323,846 | B1 | 11/2001 | Westerman et al. |
| 6,570,557 | B1 | 5/2003 | Westerman et al. |
| 6,677,932 | B1 | 1/2004 | Westerman |
| 7,614,008 | B2 | 11/2009 | Ording |
| 7,633,076 | B2 | 12/2009 | Huppi et al. |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,844,914 | B2 | 11/2010 | Andre et al. |
| 7,957,762 | B2 | 6/2011 | Herz et al. |
| 8,006,002 | B2 | 8/2011 | Kalayjian et al. |
| 8,239,784 | B2 | 8/2012 | Hotelling et al. |
| 8,279,180 | B2 | 10/2012 | Hotelling et al. |
| 8,381,135 | B2 | 2/2013 | Hotelling et al. |
| 8,479,122 | B2 | 7/2013 | Hotelling et al. |
| 9,348,458 | B2 | 5/2016 | Hotelling et al. |
| 9,933,937 | B2 | 4/2018 | Lemay et al. |
| 12,210,561 | B2 * | 1/2025 | Zhang .................... G06F 16/48 |
| 2002/0015024 | A1 | 2/2002 | Westerman et al. |
| 2005/0190059 | A1 | 9/2005 | Wehrenberg |
| 2006/0017692 | A1 | 1/2006 | Wehrenberg et al. |
| 2006/0033724 | A1 | 2/2006 | Chaudhri et al. |
| 2006/0197753 | A1 | 9/2006 | Hotelling |
| 2016/0299954 | A1 * | 10/2016 | Bawri ................. G06F 16/9038 |

(Continued)

FOREIGN PATENT DOCUMENTS

| | | |
|---|---|---|
| WO | 2013169849 A2 | 11/2013 |
| WO | 2014105276 A1 | 7/2014 |

*Primary Examiner* — Michelle N Owyang
(74) *Attorney, Agent, or Firm* — Kubota & Basol LLP

(57) ABSTRACT

Some examples described in this disclosure are directed to one or more electronic devices that facilitate searching of messages in a messaging application, wherein the search results are displayed in a search results user interface. In some examples, the electronic device displays search results associated with a search of messages performed in a messaging application at a search results user interface.

16 Claims, 20 Drawing Sheets

700

While displaying, via the display generation component, a search results user interface associated with a messaging application, receiving, via the one or more input devices, a first input corresponding to a request to display a plurality of messages associated with a search request — 702a In response to receiving the first input, displaying, via the display generation component, a plurality of representations of the plurality of messages associated with the search request, including: — 702b In accordance with a determination that a first message of the plurality of messages and a second message of the plurality of messages satisfy one or more criteria, including a criterion that is satisfied when the first message and the second message are included in a first messaging conversation, displaying, via the display generation component, a first combined search result user interface element associated with the first messaging conversation that includes a representation of the first message and a representation of the second message — 702c

(56)                    References Cited

U.S. PATENT DOCUMENTS

| | | | |
|---|---|---|---|
| 2020/0092243 A1* | 3/2020 | Milligan | H04L 51/216 |
| 2022/0027559 A1* | 1/2022 | Wang | G06F 40/289 |
| 2022/0385599 A1* | 12/2022 | Roeder | G06F 16/48 |
| 2024/0039884 A1* | 2/2024 | Deng | G06F 3/0486 |

* cited by examiner

Figure 7:
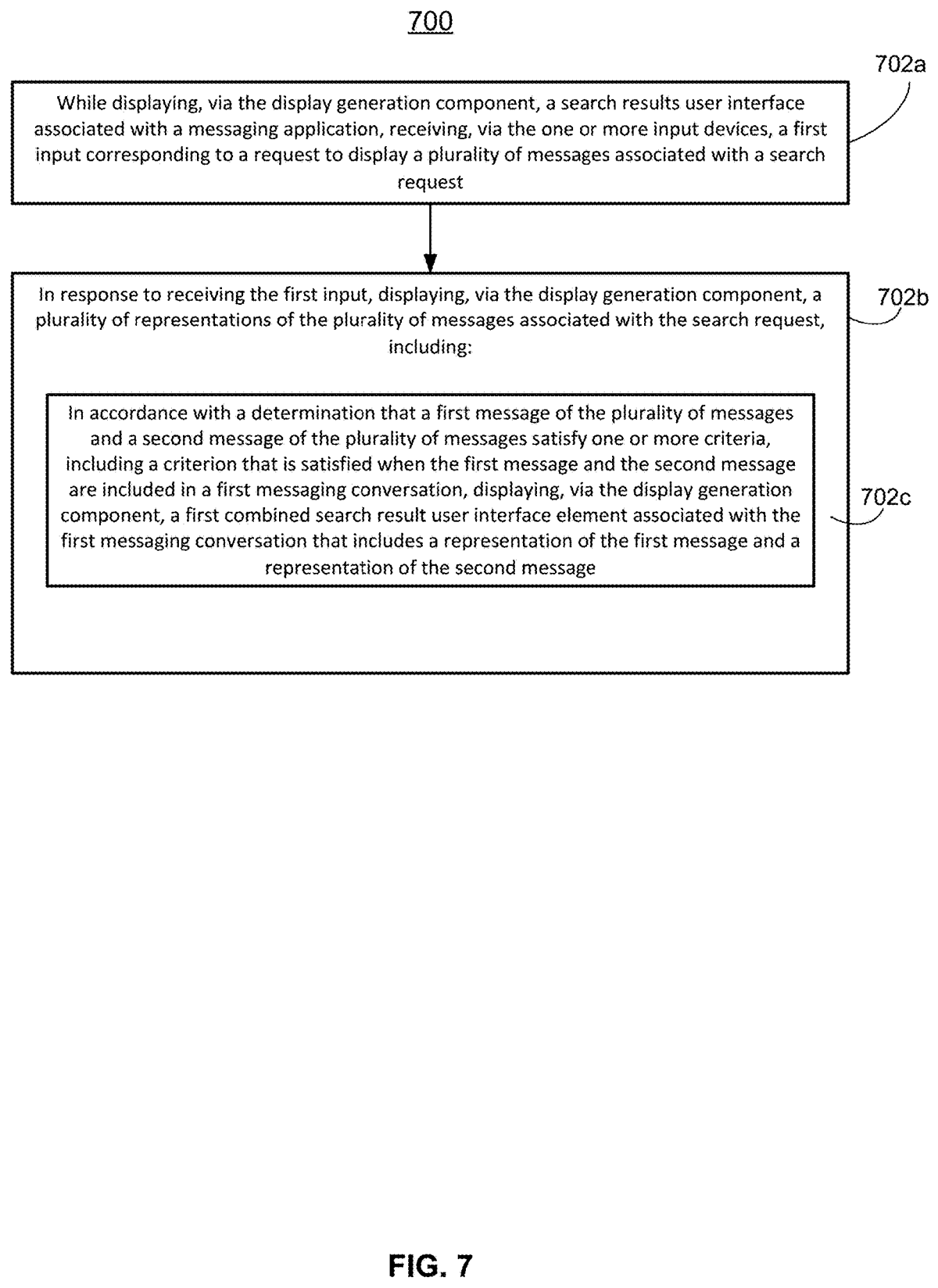

700

While displaying, via the display generation component, a search results user interface associated with a messaging application, receiving, via the one or more input devices, a first input corresponding to a request to display a plurality of messages associated with a search request          702a In response to receiving the first input, displaying, via the display generation component, a plurality of representations of the plurality of messages associated with the search request, including:          702b In accordance with a determination that a first message of the plurality of messages and a second message of the plurality of messages satisfy one or more criteria, including a criterion that is satisfied when the first message and the second message are included in a first messaging conversation, displaying, via the display generation component, a first combined search result user interface element associated with the first messaging conversation that includes a representation of the first message and a representation of the second message          702c

USER INTERFACES FOR SEARCHING IN MESSAGES

CROSS-REFERENCE TO RELATED APPLICATIONS

This application claims the benefit of U.S. Provisional Application No. 63/506,120, filed Jun. 4, 2023, the content of which is herein incorporated by reference in its entirety for all purposes.

FIELD OF THE DISCLOSURE

This relates generally to user interfaces that present information and one or more controls for searching in messages on an electronic device.

BACKGROUND

User interaction with electronic devices has increased significantly in recent years. These devices can be devices such as computers, tablet computers, televisions, multimedia devices, mobile devices, and the like.

In some circumstances, such a device presents search results relating to a search of one or more keywords found within messaging content associated with a messaging application. In some circumstances, the electronic device presents information about the search results in a user interface specific to the search results yielded from a search query within the messaging application. In some circumstances, users wish to view the results of a search of messages in the messaging application efficiently. Enhancing these interactions improves the user's experience with the device and decreases user interaction time, which is particularly important where input devices are battery-operated.

SUMMARY

Some embodiments described in this disclosure are directed to one or more electronic devices that facilitate searching of messages associated with a messaging application. Some embodiments described in this disclosure are directed to one or more electronic devices that facilitate display of messaging search results in a search results user interface. The full descriptions of the embodiments are provided in the Drawings and the Detailed Description, and it is understood that the Summary provided above does not limit the scope of the disclosure in any way.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

2

Figure 1A:
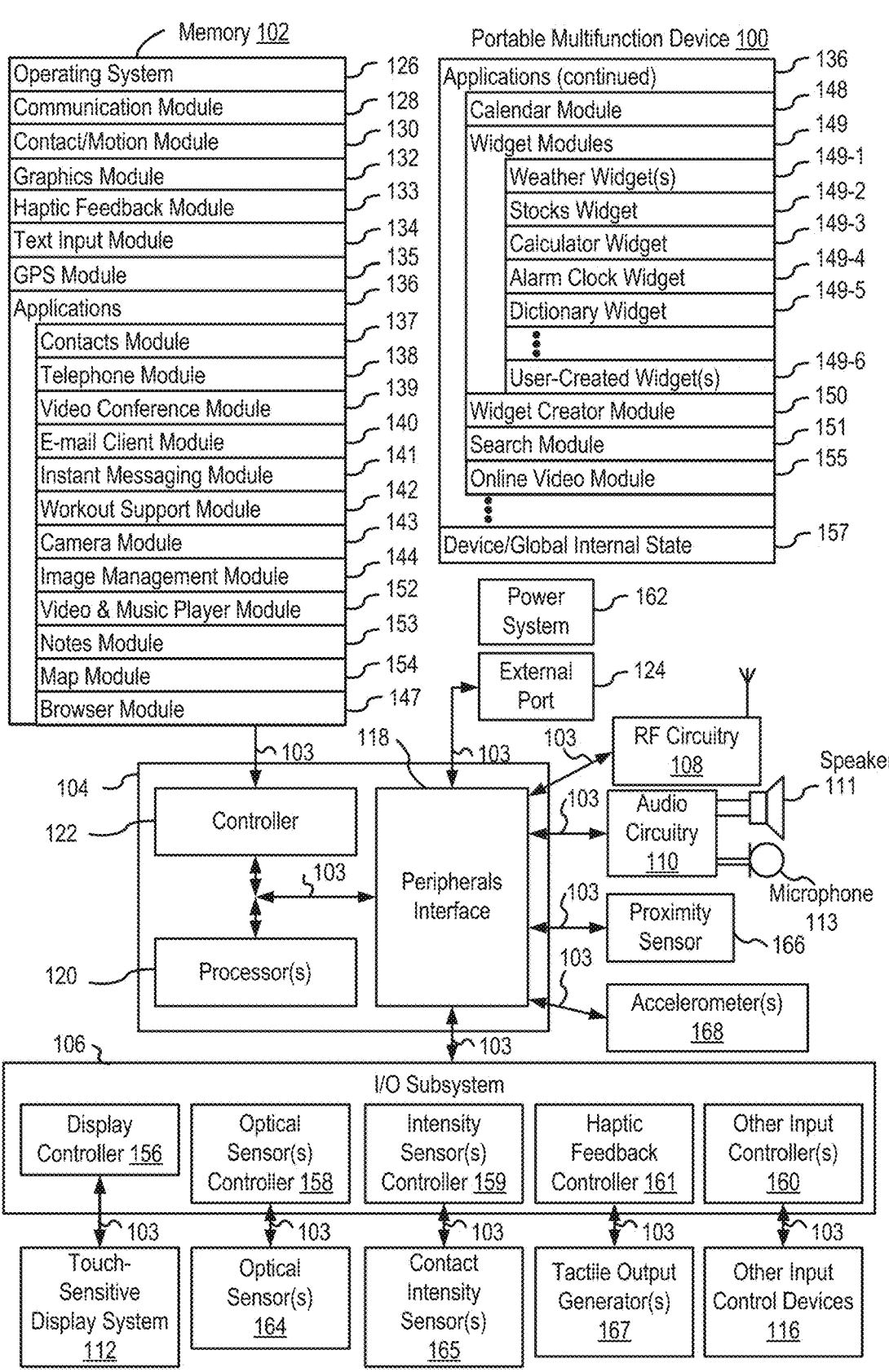
FIG. 1A is a block diagram illustrating a portable multifunction device with a touch-sensitive display in accordance with some embodiments.
Figure 1B:
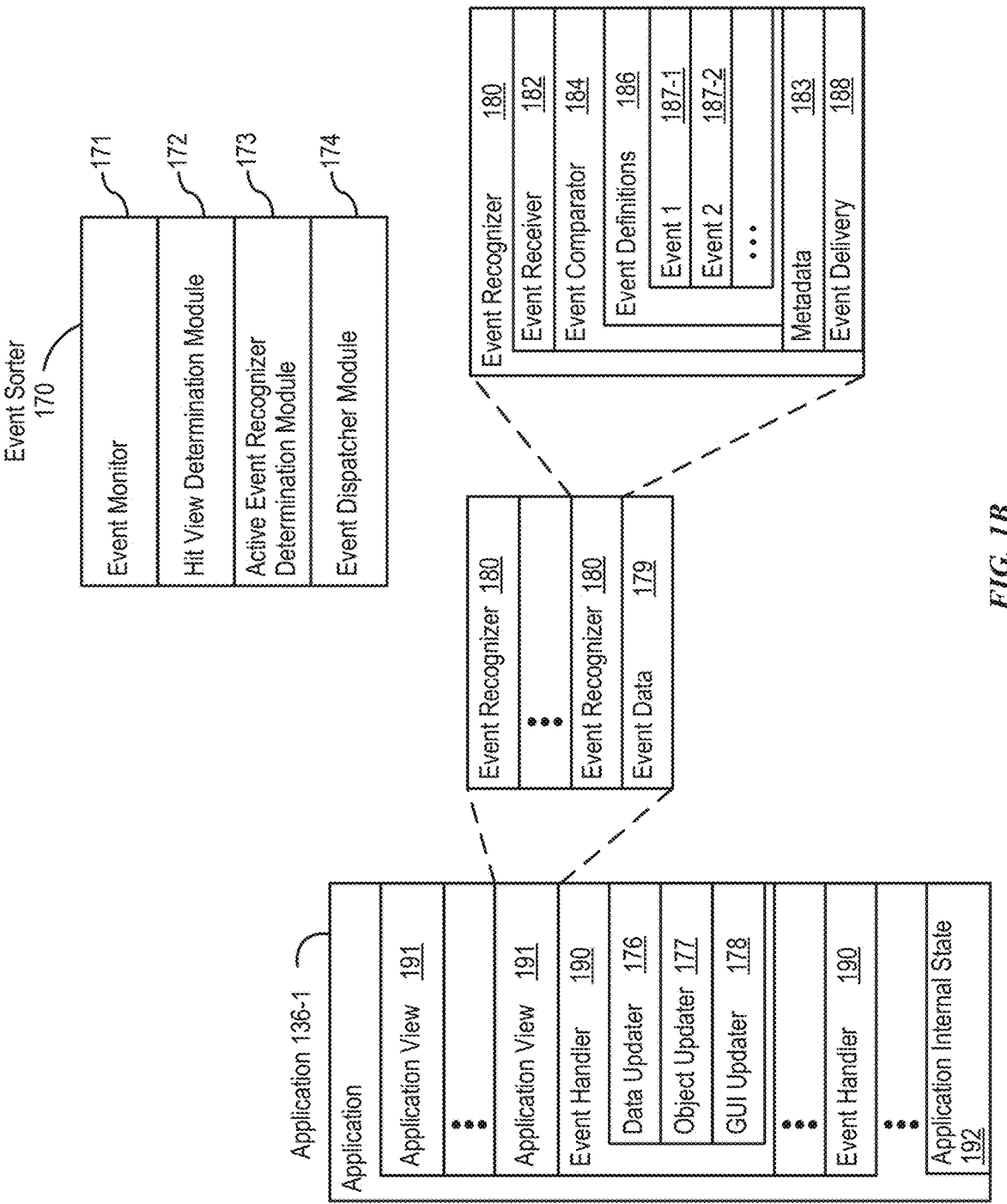

FIG. 1B is a block diagram illustrating exemplary components for event handling in accordance with some embodiments.

Figure 2:
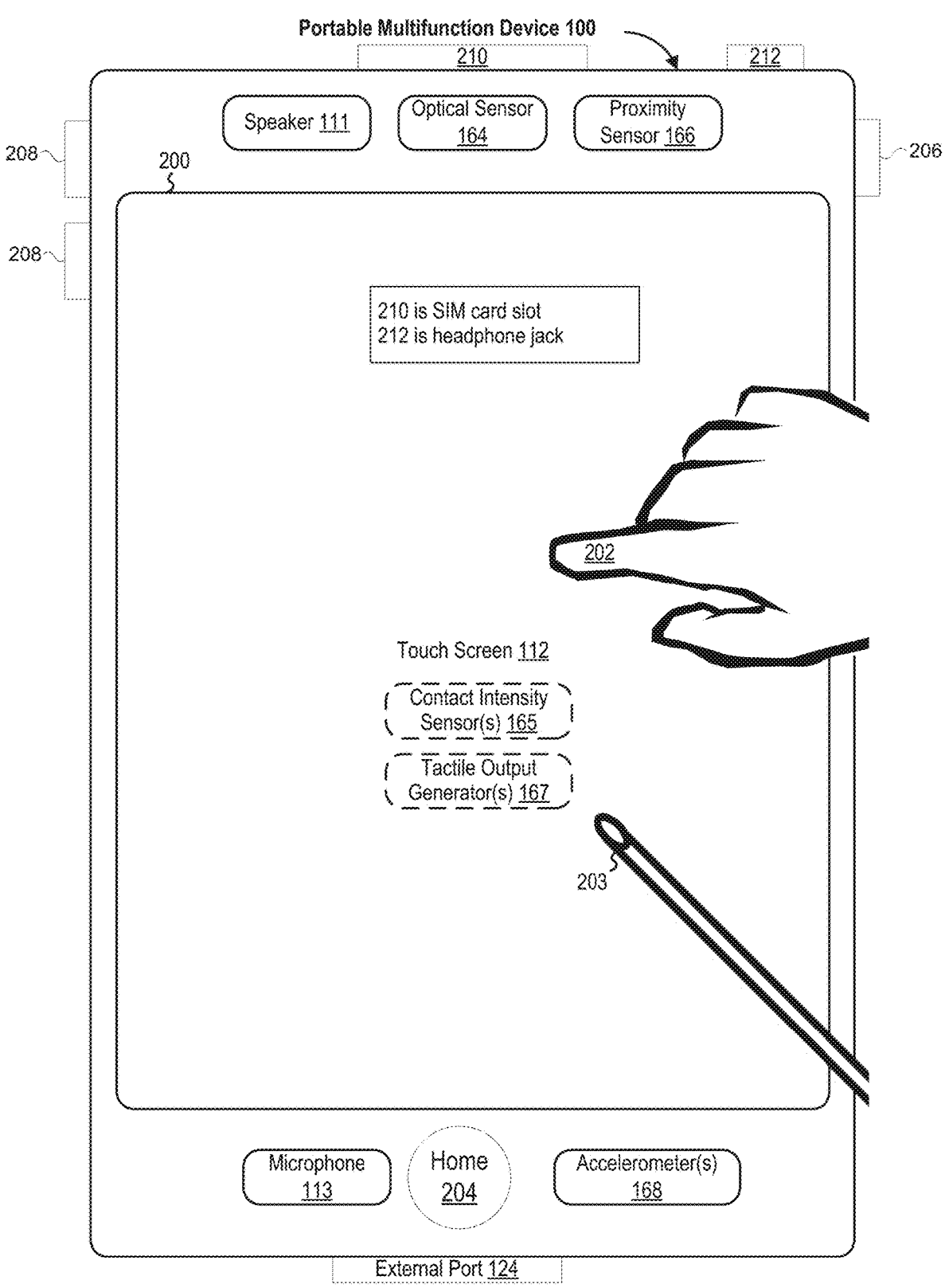

FIG. 2 illustrates a portable multifunction device having a touch screen in accordance with some embodiments.

Figure 3:
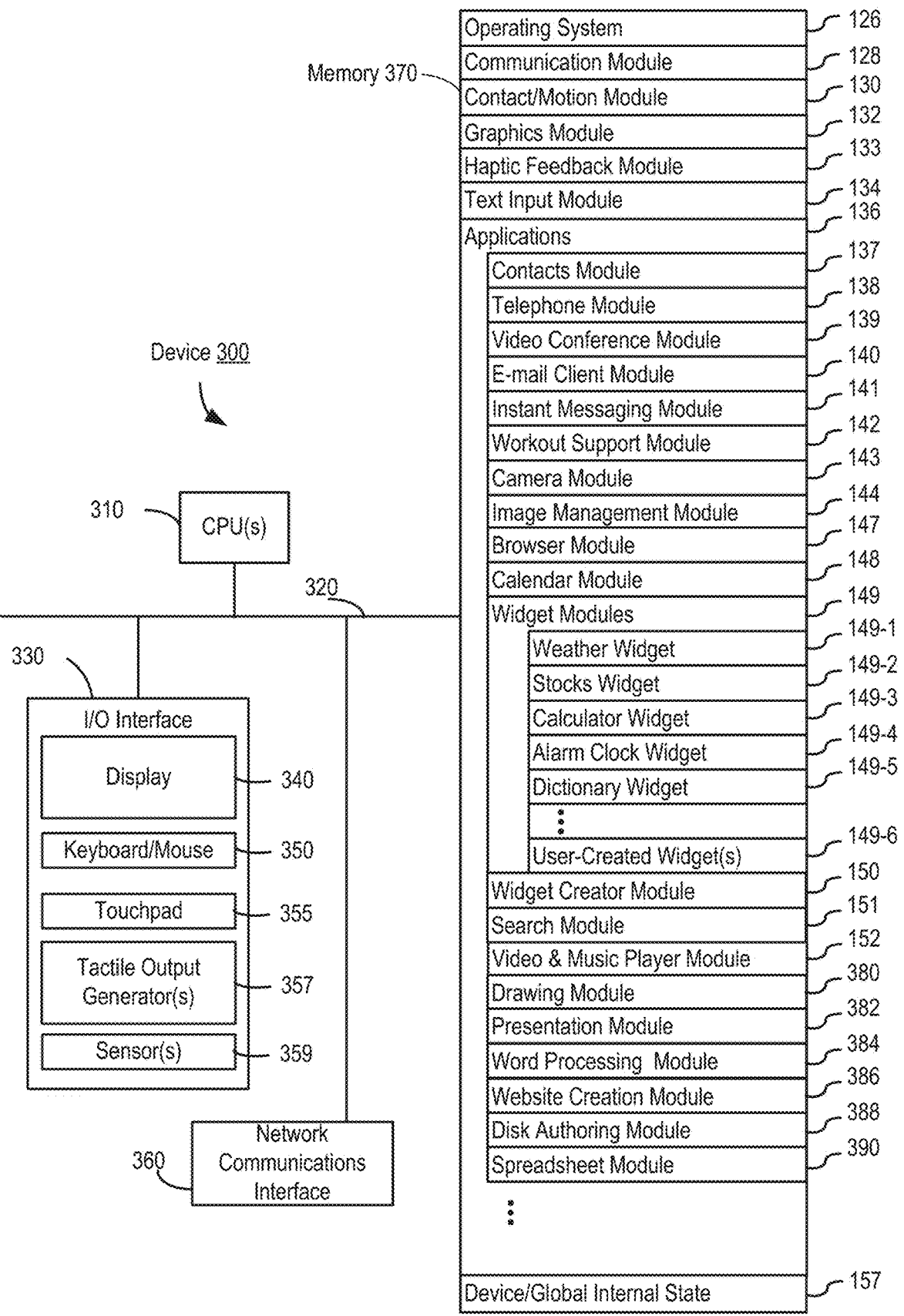

FIG. 3 is a block diagram of an exemplary multifunction device with a display and a touch-sensitive surface in accordance with some embodiments.

Figure 4A:
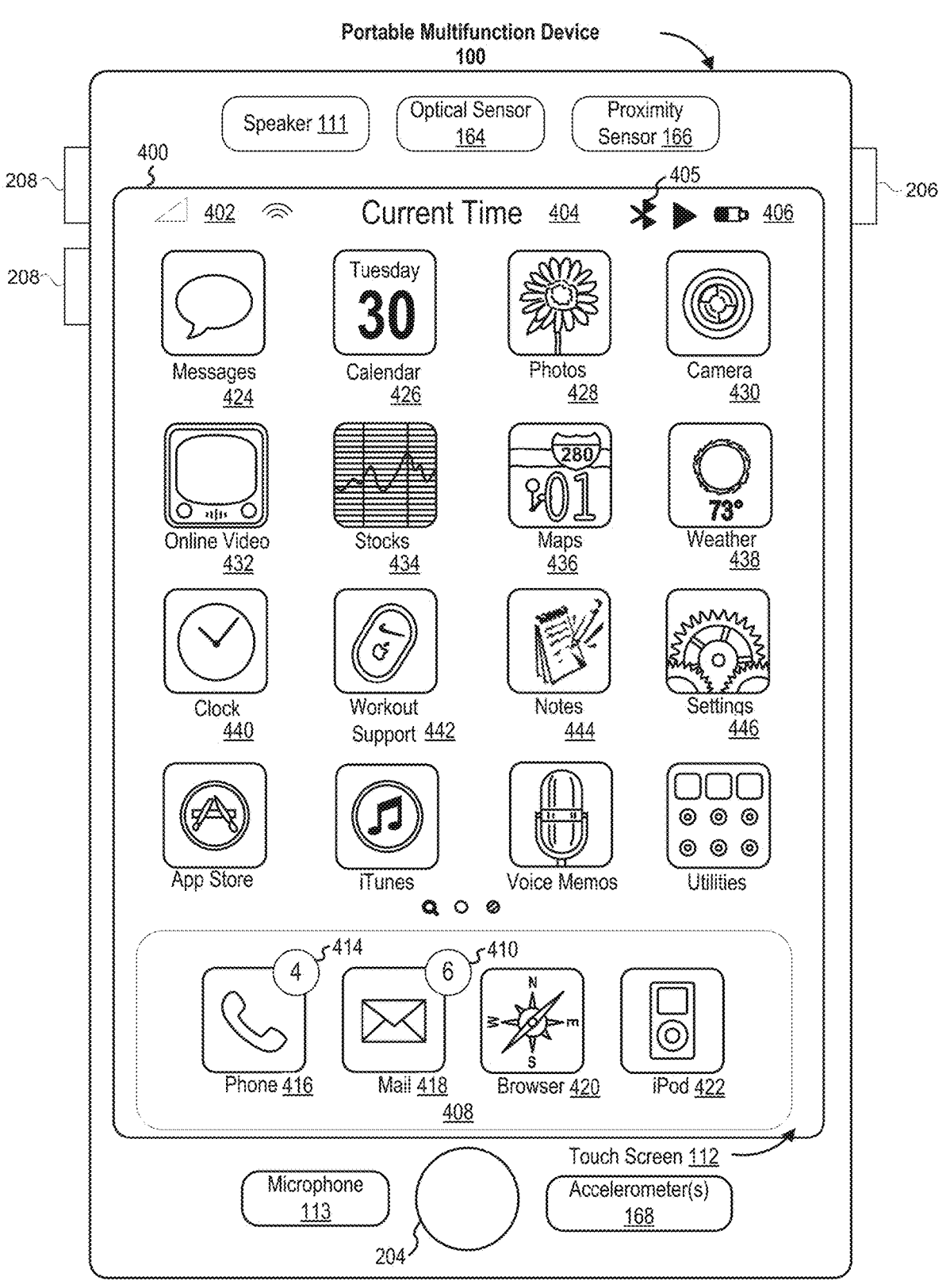

FIG. 4A illustrates an exemplary user interface for a menu of applications on a portable multifunction device in accordance with some embodiments.

Figure 4B:
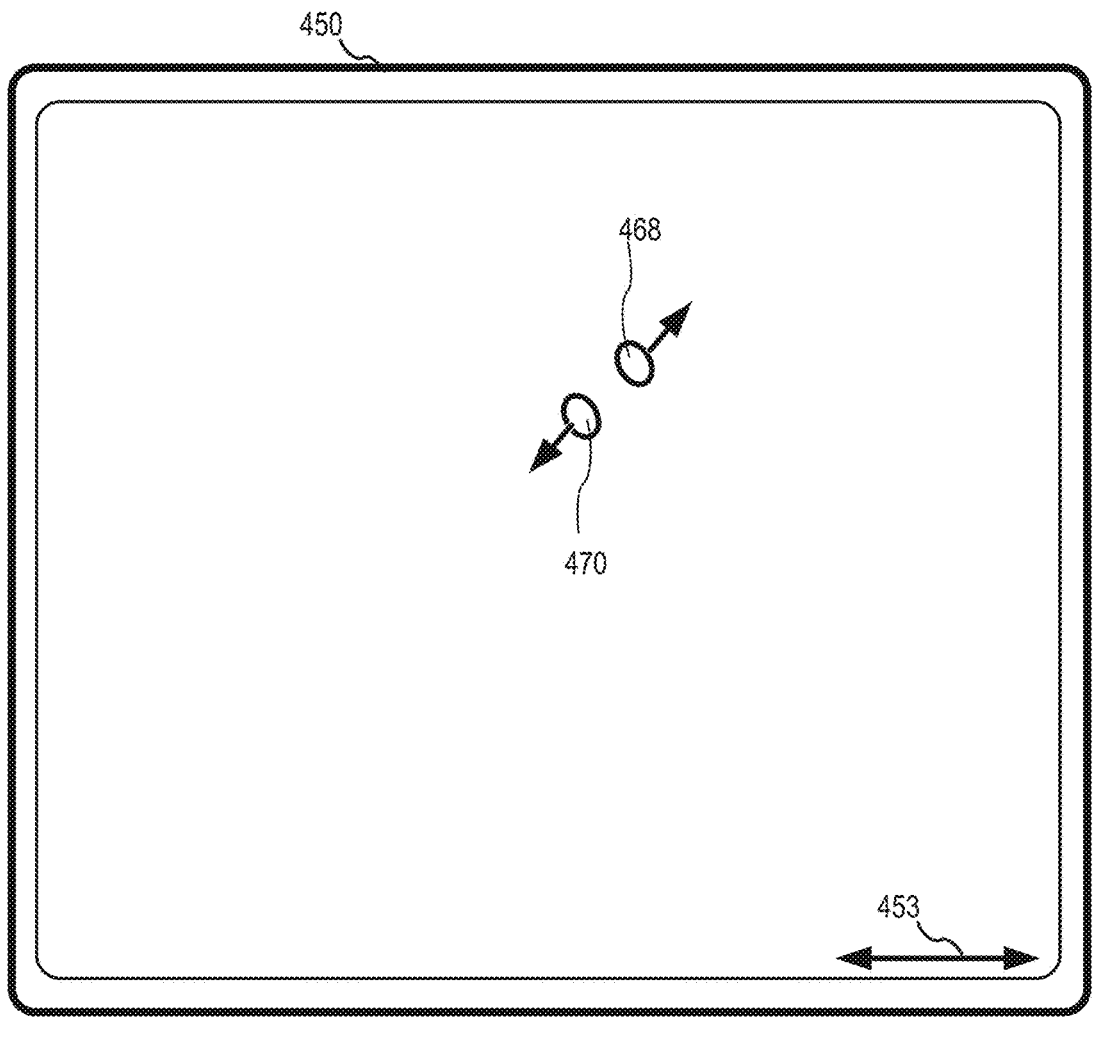
Figure 4B:
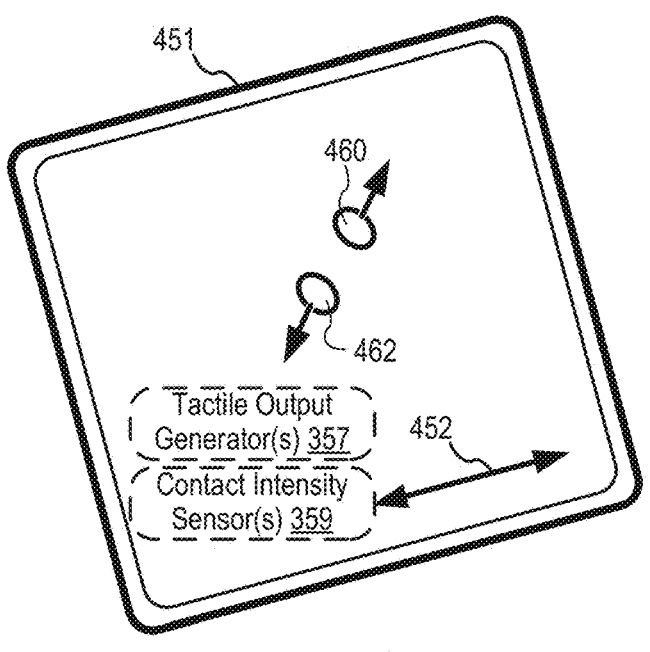

FIG. 4B illustrates an exemplary user interface for a multifunction device with a touch-sensitive surface that is separate from the display in accordance with some embodiments.

Figure 5A:
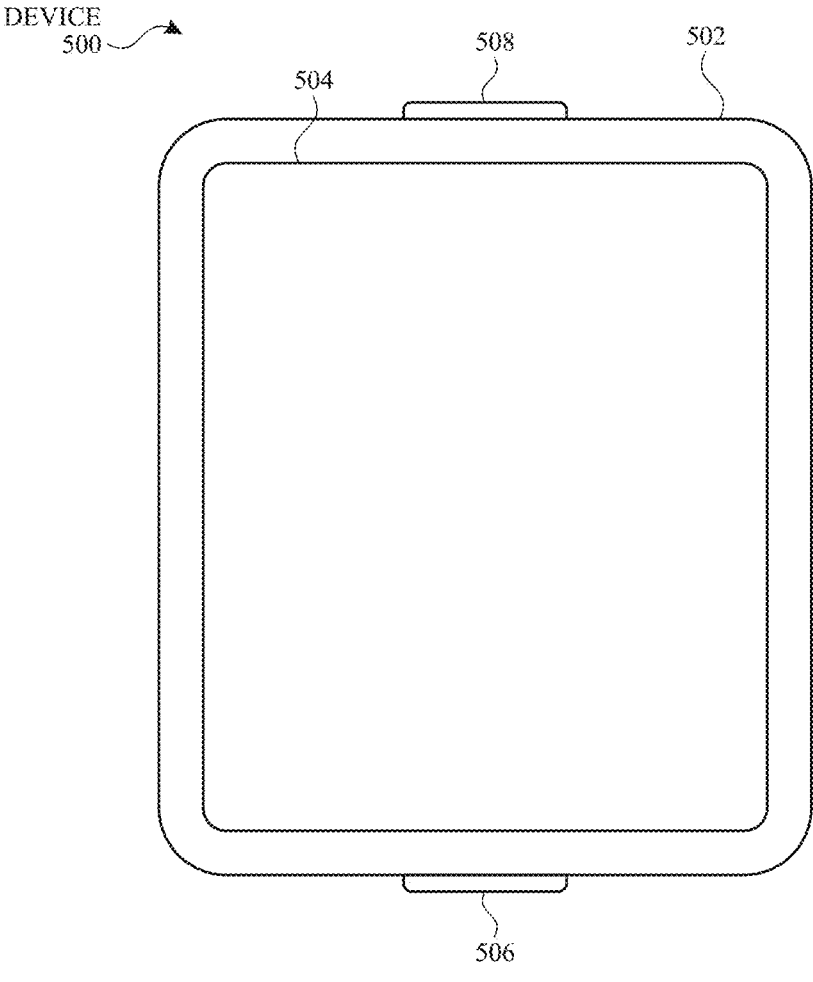

FIG. 5A illustrates a personal electronic device in accordance with some embodiments.

Figure 5B:
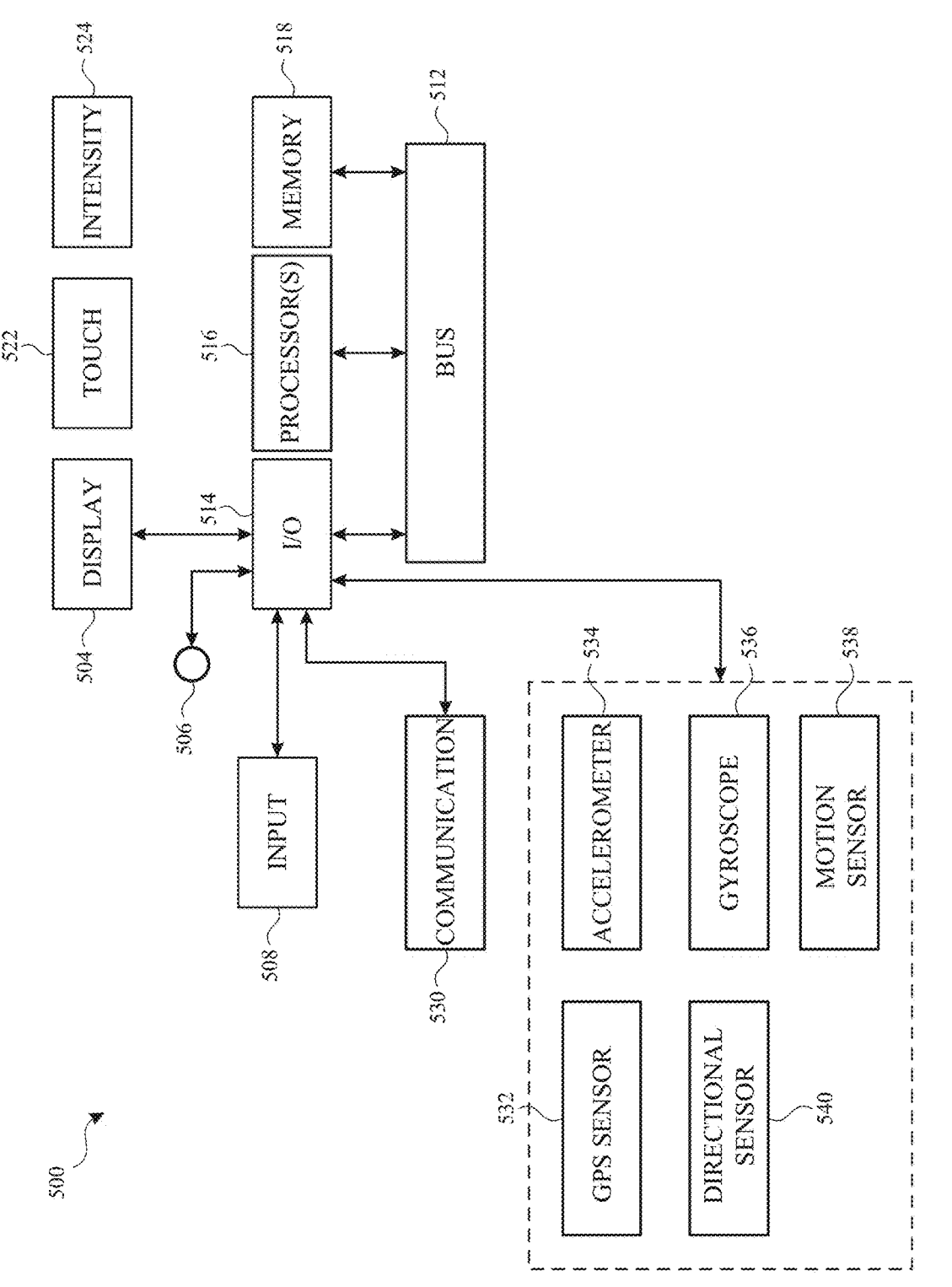

FIG. 5B is a block diagram illustrating a personal electronic device in accordance with some embodiments.

Figure 5C:
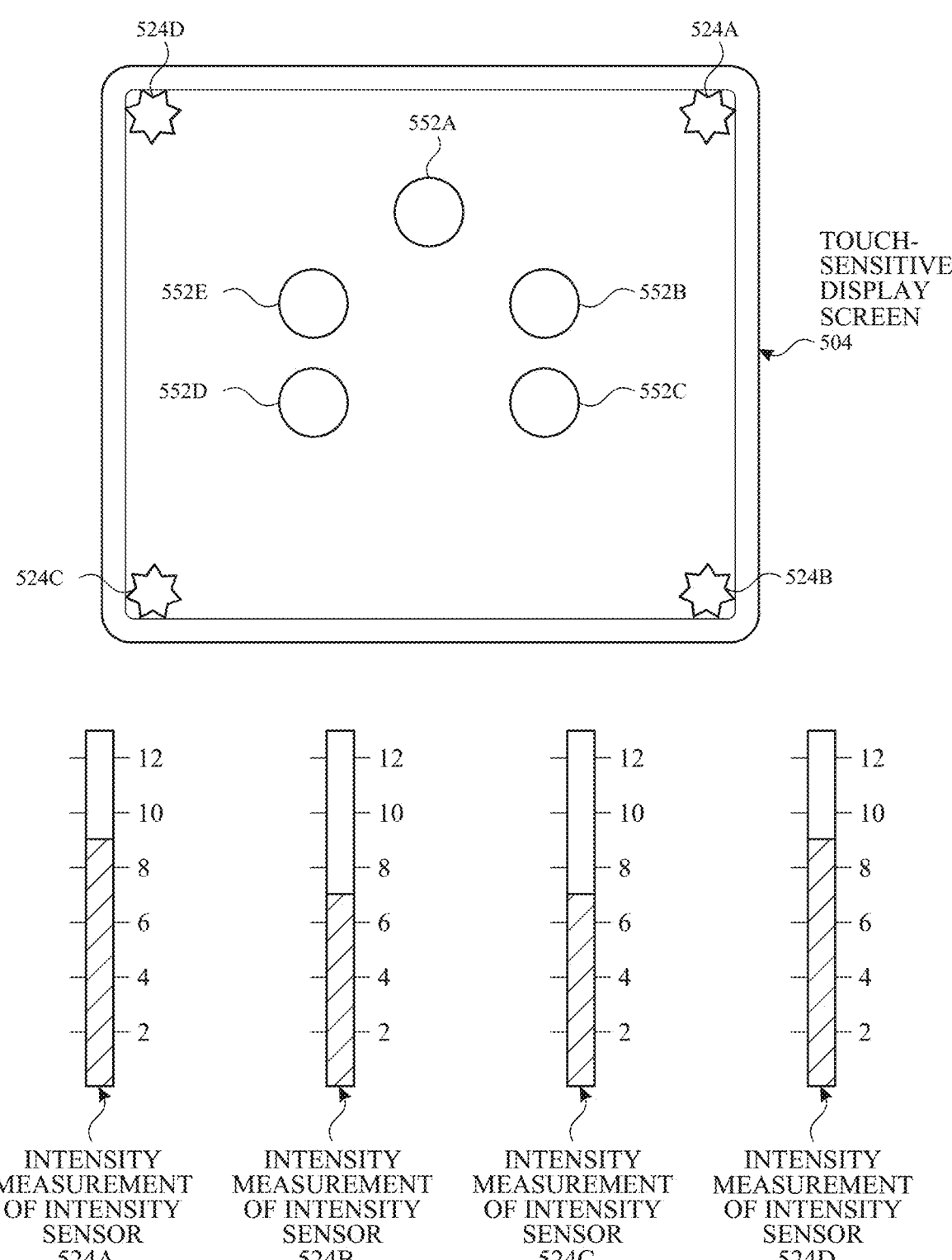
Figure 5D:
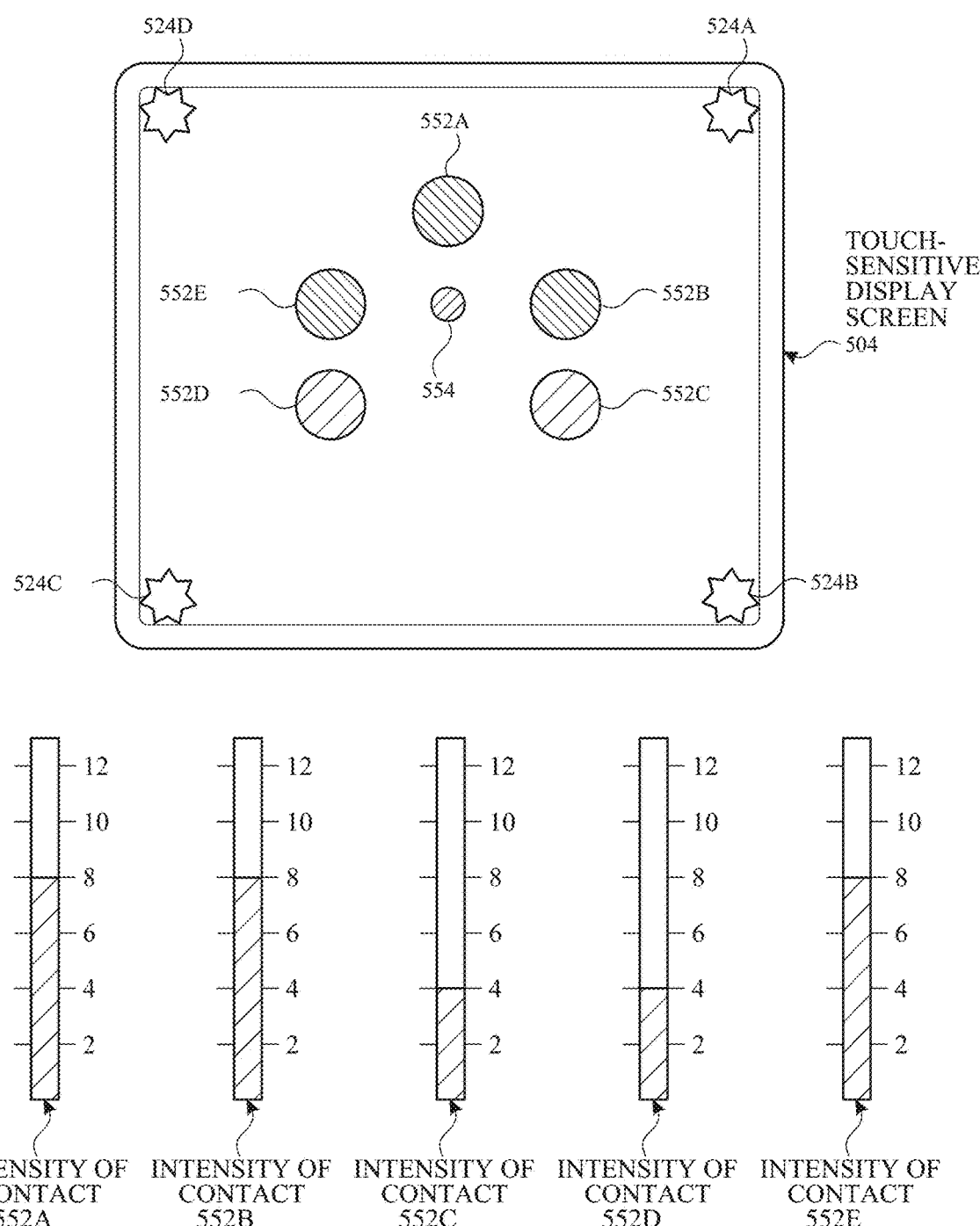

FIGS. 5C-5D illustrate exemplary components of a personal electronic device having a touch-sensitive display and intensity sensors in accordance with some embodiments.

FIGS. 5E-5H illustrate exemplary components and user interfaces of a personal electronic device in accordance with some embodiments.

FIGS. 6A-6E illustrate exemplary ways in which an electronic device facilitates searching in messages associated with a messaging application in a search results user interface in accordance with some embodiments of the disclosure.

FIG. 7 is a flow diagram illustrating a method of searching in messages associated with a messaging application in a search results user interface in accordance with some embodiments.

DETAILED DESCRIPTION

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods for searching in messages associated with a messaging application in a search results user interface. In some embodiments, the electronic device displays search results associated with a search of messages performed in a messaging application at a search results user interface. In some embodiments, while search results associated with a search of messages in a messaging application is displayed in a search results user interface, the electronic device receives a first input corresponding to a request to display a plurality of messages associated with a search request. In some embodiments in response to receiving the first input, the electronic device displays, via the display generation component, a plurality of representations of the plurality of messages associated with the search request including: in accordance with a determination that a first message of the plurality of messages and a second message of the plurality of messages satisfy one or more criteria, including a criterion that is satisfied when the first message and the second message are included in a first messaging conversation, the electronic device displays, via the display generation component, a first combined search result user interface element associated with the first messaging conversation that includes a representation of the first message and a representation of the second message. Such techniques can reduce the cognitive burden on a user who uses such devices. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Exemplary Devices

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad). In some embodiments, the electronic device is a computer system that is in communication (e.g., via wireless communication, via wired communication) with a display generation component (e.g., a display device such as a head-mounted device (HMD), a display, a projector, a touch-sensitive display, or other device or component that presents visual content to a user, for example on or in the display generation component itself or produced from the display generation component and visible elsewhere). The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as a "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both cars) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/ to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228, 700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's car (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, IOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client module 140, IM 141, browser 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof:

contacts module 137 (sometimes called an address book or contact list);
    telephone module 138;
    video conferencing module 139;
    e-mail client module 140;
    instant messaging (IM) module 141;
    workout support module 142;
    camera module 143 for still and/or video images;
    image management module 144;
    video player module;
    music player module;
    browser module 147;
    calendar module 148;
    widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
    widget creator module 150 for making user-created widgets 149-6;
    search module 151;
    video and music player module 152, which merges video player module and music player module;
    notes module 153;
    map module 154; and/or
    online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail client module 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As previously described, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For case of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

FIG. 5A illustrates a block diagram of an exemplary architecture for the device 500 according to some embodiments of the disclosure. In the embodiment of FIG. 5A, media or other content is optionally received by device 500 via network interface 502, which is optionally a wireless or wired connection. The one or more processors 504 optionally execute any number of programs stored in memory 506 or storage, which optionally includes instructions to perform one or more of the methods and/or processes described herein (e.g., method 700). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIGS. 5, but can include other or additional components in multiple configurations.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A\cdot(Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
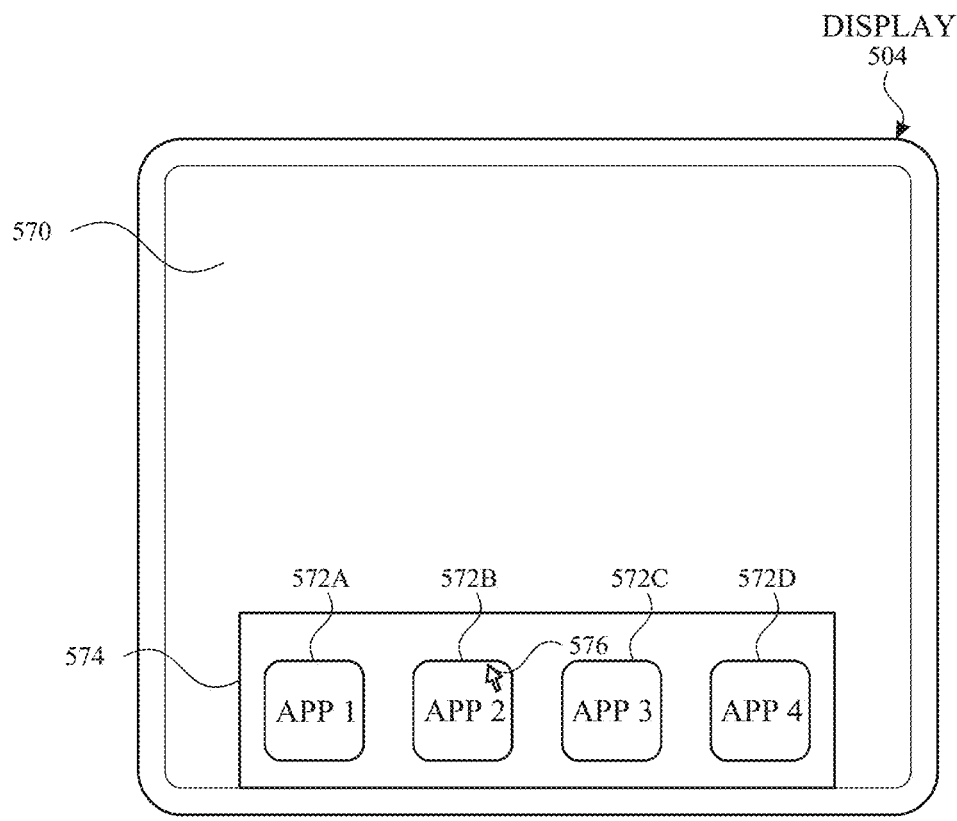
Figure 5E:
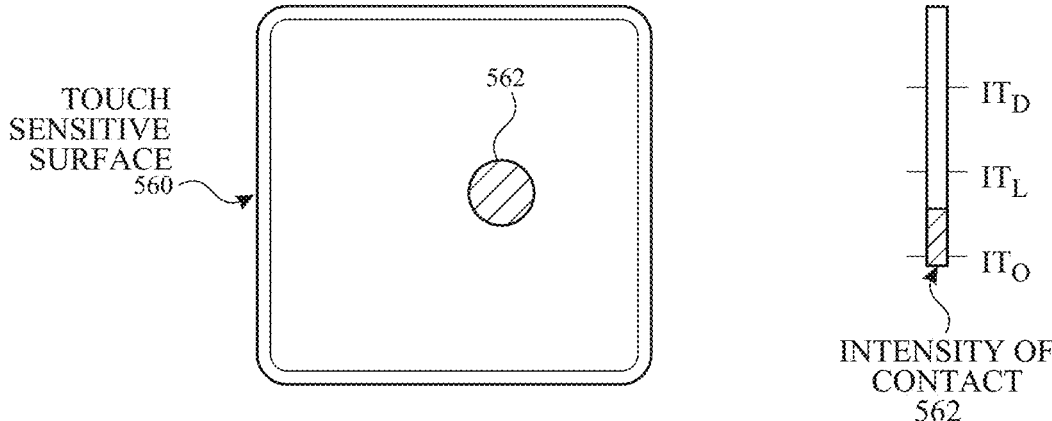
Figure 5F:
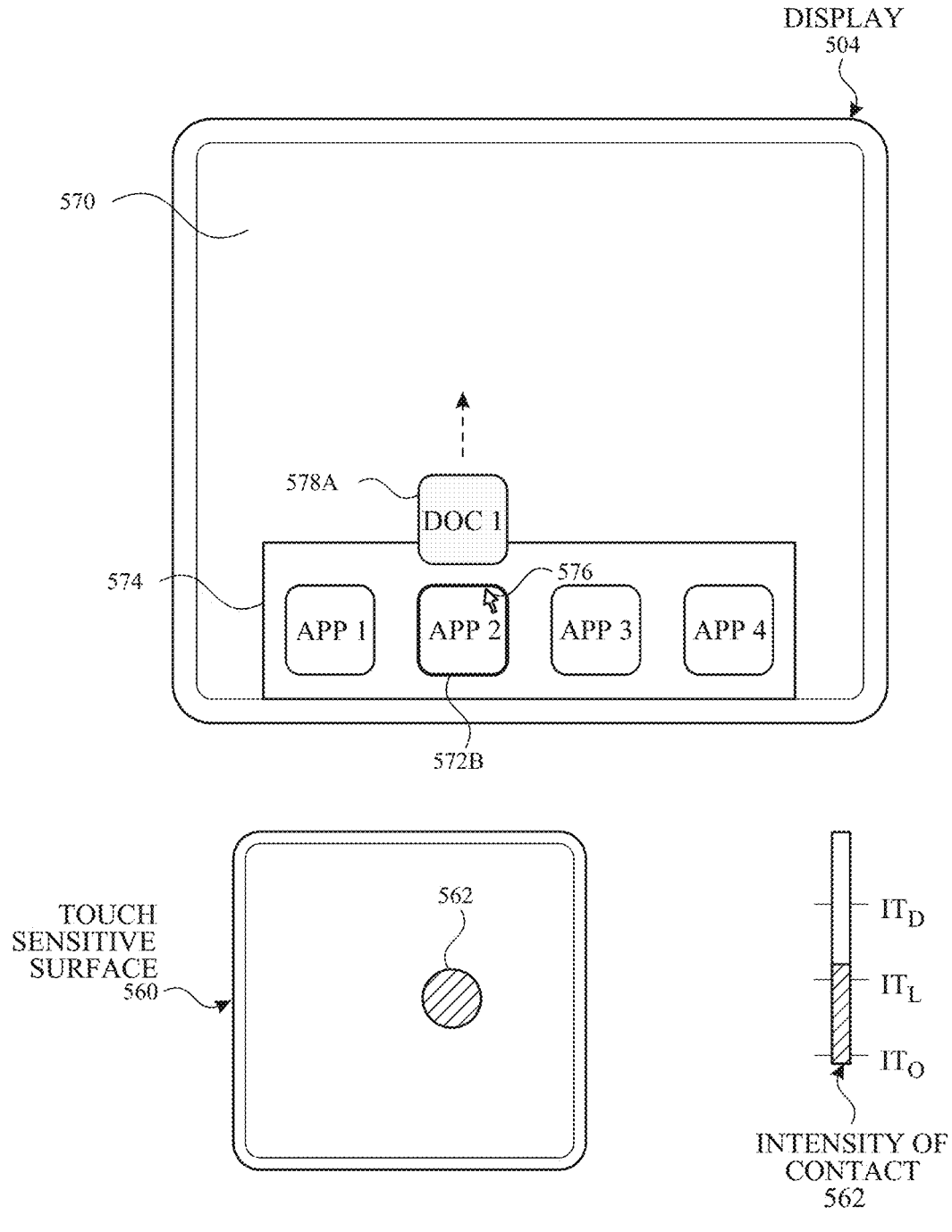
Figure 5G:
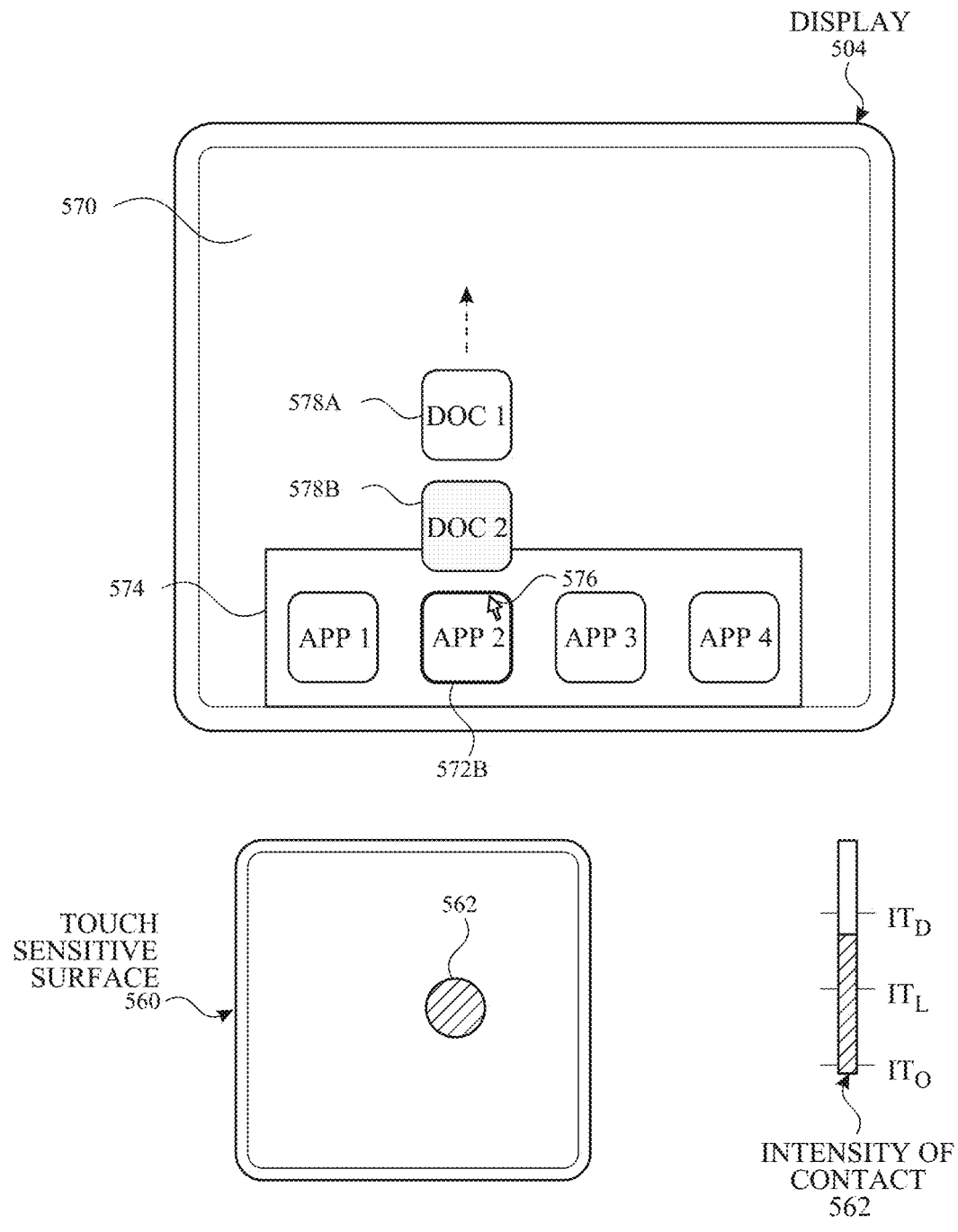
Figure 5H:
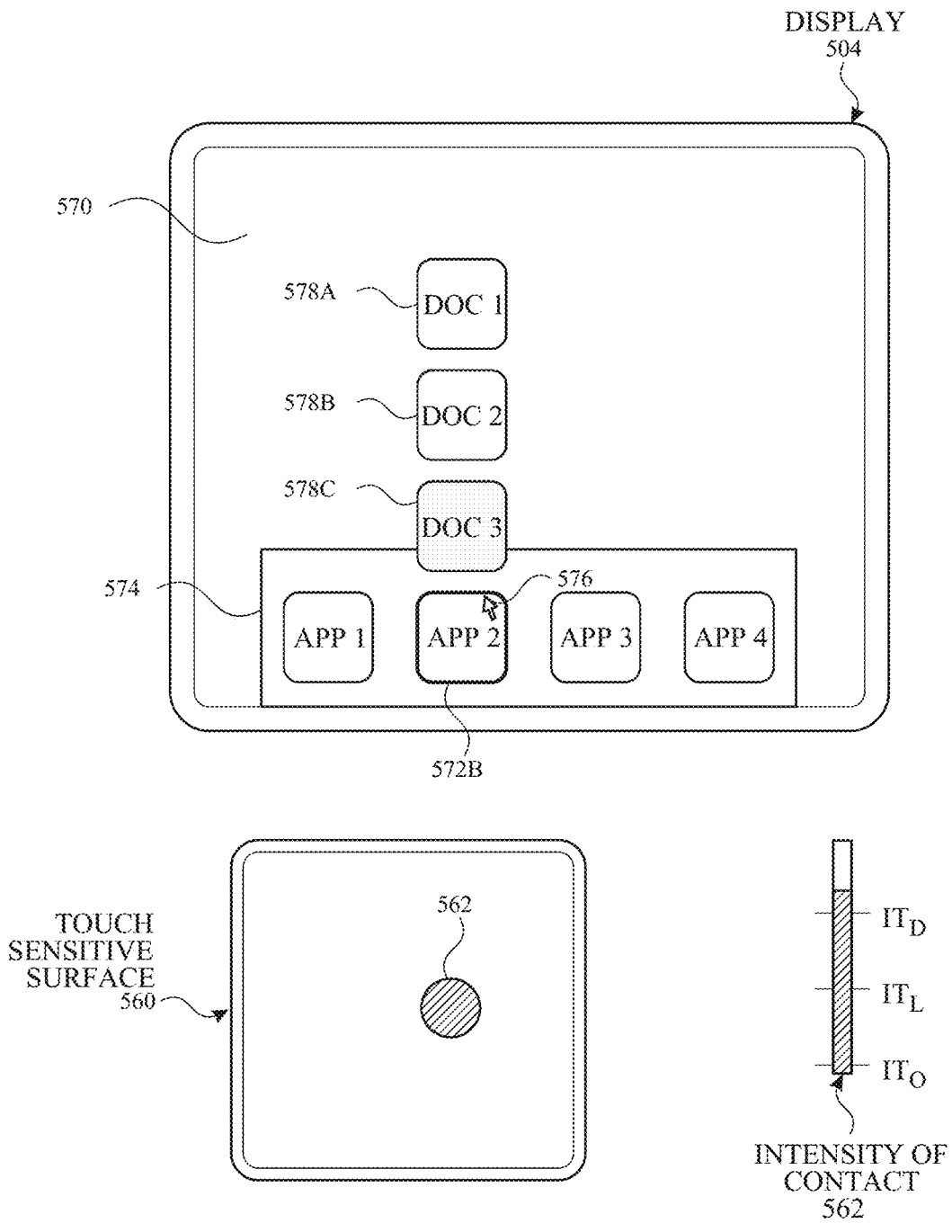

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;
 a background application (or background processes), which is not currently displayed, but one or more processes for the application are being processed by one or more processors; and
 a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as device 100, device 300, or device 500.

User Interfaces and Associated Processes
User Interfaces for Searching in Messages Users interact with electronic devices in many different manners, including interacting with messaging applications for sending and receiving electronic messages to other people or groups of people. In some embodiments, an electronic device displays a messaging conversation in a messaging application, where the messaging conversation includes messages sent from the user of the electronic device as well as messages sent to the user of the device from other people. In some circumstances, the messages transmitted from and received by the messaging application includes text messages, images, web links, and other data. The messaging application facilitates the exchange of messages between the user of the electronic device and other external users. In some circumstances, the messaging application facilitates a group messaging conversation. A group messaging conversation allows for a plurality of users that belong to the group messaging conversation to share messages with one another such that messaging activity occurring on the group messaging conversation will be seen by other or all of the plurality of users who are members/users of the group messaging conversation. In some circumstances, the messaging application facilitates searching of past messaging activity. In response to a user provided search query (e.g., in the form of user provided text) the device searches through past messaging activity, including but not limited to, past text messages, group messaging conversations, photos, and web-links, to generate search results that are relevant to the search query. Once the device generates the search results, in some circumstances the device displays the generated search results using one or more user interfaces. In some embodiments, the device displays the search results chronologically, for instance by displaying each relevant message starting with most recent at the top of a user interface. However, only displaying messaging activity chronologically can mask information about the search results that may be helpful to the user. For instance, if multiple messages are associated with the same messaging conversation, only displaying each individual message in chronological order can mask the fact that the messaging activity belongs to the same messaging conversation. Grouping relevant search results by messaging conversation, can allow the user to efficiently determine when search results belong to the same messaging conversation, however, only grouping messaging activity by conversation without regard to the chronological order in which the messaging activity occurred can also mask important information from the user of the electronic device. The embodiments described below provide ways in which an electronic device provides efficient user interface for displaying search results in a messaging application both by messaging conversation and chronologically, thus enhancing the user's interaction with the device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 6A-6E illustrate exemplary ways in which an electronic device displays user interfaces for displaying and interacting with search results on a messaging application. The embodiments in these figures are used to illustrate the processes described below, including the processes described with reference to FIG. 7. Although FIGS. 6A-6E illustrate various examples of ways an electronic device is able to perform the processes described below with respect to FIG. 7, it should be understood that these examples are not meant to be limiting, and the electronic device is able to perform one or more processes described below with reference to FIG. 7 in ways not expressly described with reference to FIGS. 6A-6E.

Figure 6A:
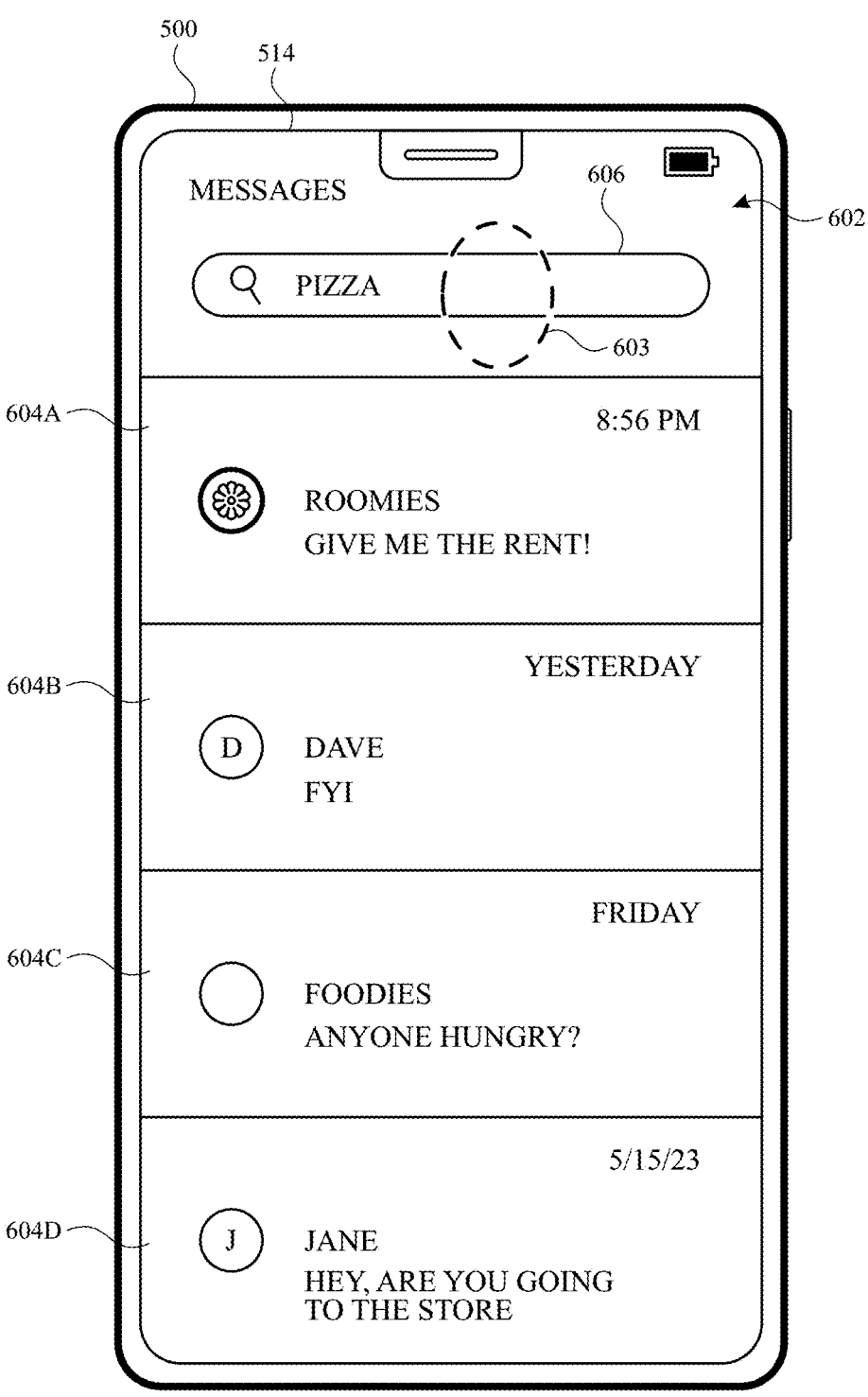

FIG. 6A illustrates an exemplary device 500 displaying a user interface 602. In some embodiments, the user interface 602 is displayed via a display generation component. In some embodiments, the display generation component is a hardware component (e.g., including electrical components) capable of receiving display data and displaying a user interface. In some embodiments, examples of a display generation component include a touch screen display, a monitor, a television, a projector, an integrated, discrete, or external display device, or any other suitable display device.

In some embodiments, an electronic device (e.g., device 500) includes a messaging application. The messaging application can represent messaging activity sent from other electronic devices (by users of those respective devices) and messaging activity originating at the electronic device (sent by the user of the electronic device). In some embodiments, messaging activity transmitted and received by the messaging application includes, but is not limited to, text messages, images, photos, web-based links, and other media. In some embodiments, the messaging application, and specifically the one or more user interfaces associated with the messaging application allow the user of the electronic device to view messaging activity received at and transmitted from the electronic device. Additionally, the one or more user interfaces, facilitate searching the messaging activity stored on the device as described above.

As shown in FIG. 6A, the electronic device 500 displays a user interface 602 (e.g., of a messaging application installed on device 500) on touch screen 504. In some embodiments, user interface 602 is any user interface that displays information about one or more messaging conversations including both group messaging conversations as well as user-to-user messaging conversations. In some embodiments, user interface 602 includes one or message portions 604a-d for listing messaging activity associated with the electronic device. For instance, as illustrated in FIG. 6A, messaging portions 604a-d include identifying information associated with messaging activity. In the case where the messaging activity is associated with a group messaging conversation, the identifying information of messaging portions 604a-d optionally include a name and/or a photo associated with the group messaging conversation. In the case where the messaging activity is associated with a non-group messaging conversation (e.g., a user-to-user conversation) the identifying information of messaging portions 604a-d optionally include a name and/or photo associated with the external user that is a part of the messaging conversation. In some embodiments, message portions 604a-d include time information for indicating when the last messaging activity associated with a particular messaging conversation was received at or transmitted by the device.

Figure 6B:
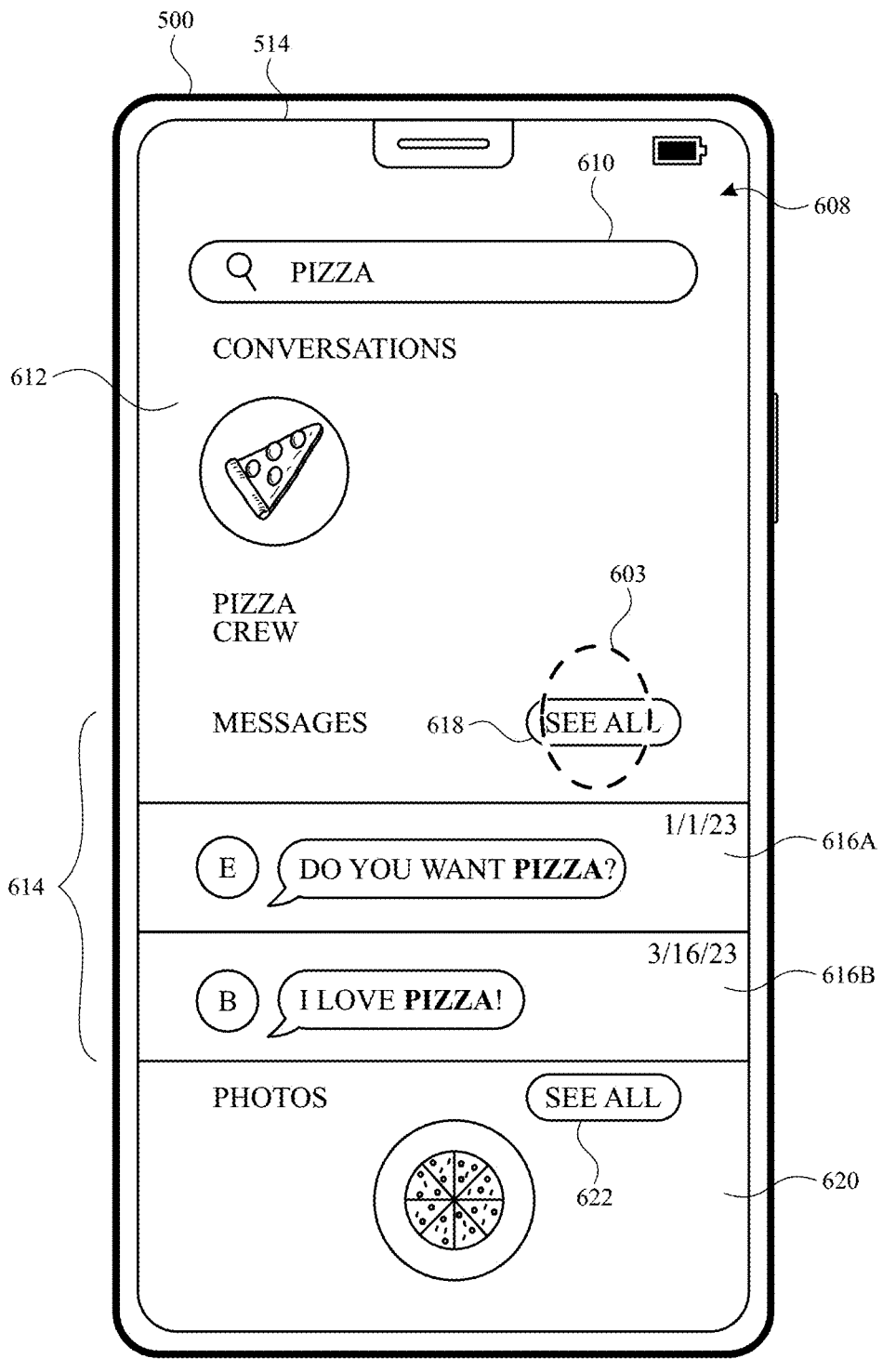

In some embodiments, user interface 602 includes a search entry portion 606 for receiving one or search queries (e.g., from using a touchscreen keyboard) from a user of the electronic device. The search entry portion 606 is selectable (e.g., via a tap of contact 603 on portion 606). In response to detecting selection of search entry portion 606, and in accordance with receiving a search query from the user, the device 500 displays a search results user interface 608 for interacting with the search results associated with the received search query as illustrated at FIG. 6B. In some embodiments, search results user interface 608 includes search entry portion 606 that is substantially identical to search entry portion 606 described above with respect to FIG. 6A. In some embodiments, the search entry portion 610 of search results user interface 608 includes a representation of the search query received at the device. For instance, as illustrated at FIG. 6B, in response to the user searching for relevant messaging content associated with "Pizza" the device displays the word "pizza" at search entry portion 610.

In some embodiments, search results user interface 608 includes a partial list of search results for one or more categories of messaging activity. For instance, search results user interface 608 includes a messaging conversation results portion 612 that includes one or more messaging conversations that include identifying information that matches the received search query. For instance, in response to a search for "pizza," messaging conversation results portion 612 includes a representation of the "Pizza Crew" group messaging conversation. In some embodiments, the messaging conversations that include identifying information that is relevant to the received search query is represented at search results portion 612 using its identifying information, which includes but is not limited to, the name of the messaging conversation and/or an image associated with the messaging conversation. In some embodiments, search results user interface 608 includes a photos results portion 620 that includes one or more photos that are determined to be relevant to the received search query. For instance, in response to a search for "pizza," photo results portion 620 includes one or more photos that have been determined by the electronic device to include pizza. In some embodiments, the search results user interface 608 can include other types of content in addition or alternatively to the examples provided above. For instance, search results interface 608 can include result portions associated with shared articles, weblinks, videos, documents, etc.

In some embodiments, search results user interface 608 includes a message results portion 614 that includes one or more messages (e.g., text messages) that are determined by the device to be relevant to the received search query. For instance, in response to a search for "pizza" the message results portion 614 of search results user interface 608 includes message results 616*a-b* that include the word pizza in them. In some embodiments, the results that are part of message results portion 614 include identifying information associated with the result such as an avatar associated with the user sent the message. Additionally or alternatively, the results 616*a-b* include time information (e.g., the date and/or time when the message was sent). Optionally, the results 616*a-b* are listed in chronological order as illustrated in FIG. 6B. In some embodiments, the message results portion 616 includes results without indicating whether the result is associated with a particular messaging conversation that is stored on the electronic device. Instead, the results 616*a-b* optionally includes an avatar associated with the user that transmitted the message. In some embodiments, the visual appearance of the messages 614 are the same as when those messages are displayed in a messaging conversation user interface such as that displayed in FIG. 6E. In some embodiments, the messages 614 are optionally from the same conversation or from different messaging conversations.

As described above, each category results portion 612, 614, and 620 of search user interface 608 includes a partial listing of the results associated with each category. For instance, the messages results included in message results portion 614 optionally represent only a partial listing of all messages determined to be relevant to the search query by the device. In some embodiments, the result portions 612, 614, and 620 include a selectable option for viewing an expanded list of matching results associated with a particular category of results. For instance, photo results portion 620 includes a selectable option 622 for viewing an expanded list of matching photo results. Similarly, message results portion 614 includes selectable option 618 for viewing an expanded list of matching message results.

Figure 6C:
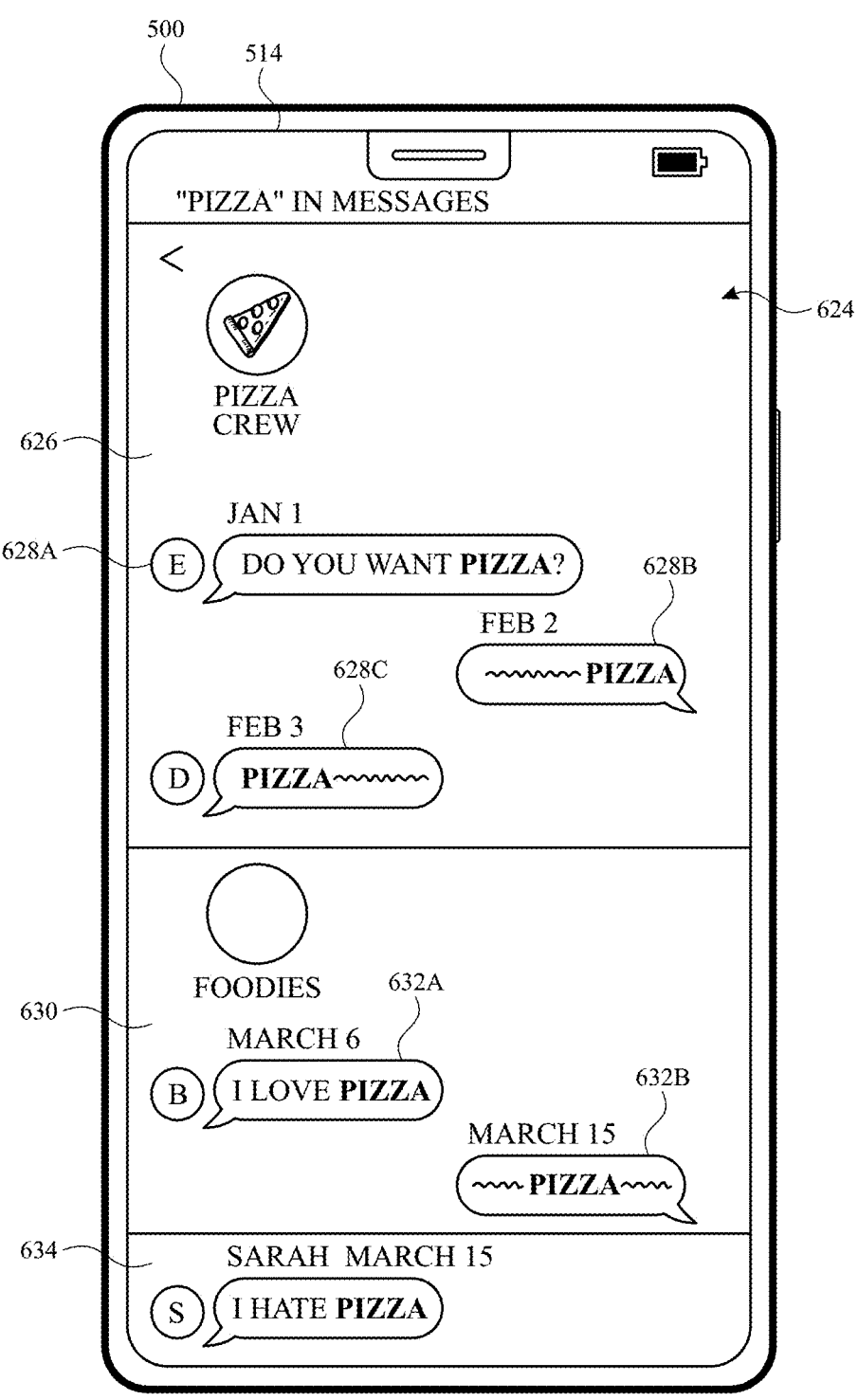

In some embodiments, and in response to detecting selection of selection option 618 (e.g., via tap of contact 603 on selectable option 618) the device displays an expanded results user interface 624 as shown in FIG. 6C. In some embodiments, expanded results user interface 624 includes some or all of the messaging results determined to be relevant to a received search query by the device. The expanded results user interface optionally includes one or more messages that were not included as part of search results user interface 608. In some embodiments, the device displays the relevant messages on expanded results user interface 624 in chronological order. Additionally, in some embodiments, the expanded search results user interface 624 provides one or more visual indicators for indicating that one or more message results are part of the same messaging conversation. For instance, messaging results portion 626 includes one or more messaging results associated with the "Pizza Crew" group messaging conversation. Specifically, messaging results 628*a-c* are indicated as belonging to the Pizza Crew group messaging using one or more visual indicators. Messaging results portion 626 optionally includes a visual indicator that represents the identifying information (e.g., name and/or photo) associated with the "Pizza Crew" group messaging conversation. Additionally, messaging results portion 626 optionally includes a line or other marker at the bottom of the portion indicating where the messaging results portion ends, thus delineating or visually distinguishing the messaging results portion 626 from other messaging results portions such as messaging results portion 630 which includes messages associated the "Foodies" group messaging conversation.

In some embodiments, messaging portion 630 includes messaging results 632*a-b*. Similar to the example of messaging results portion 626 described above, messaging results 632*a-b* are messages that have been determined by the device to be relevant to the received search query (e.g., because the messages have the word "pizza" in them) and are also part of the same messaging conversation (e.g., the "Foodies" group messaging conversation). Similar to messaging results portion 626, messaging results portion 630 includes one or more visual indicators configured to visually indicate that the message results contained within messaging results portion 630 are part of the same messaging conversation, including but not limited to, identifying information associated with the messaging conversation (e.g., name and/or photo) as well as one markers to indicate where the messaging portion ends on the user interface 624.

In addition to including messaging conversation portions, expanded search results user interface 624 includes a messaging results portion 634 that includes a messaging result that is from a non-group messaging conversation (e.g., user-to-user messaging conversation) that only has a single message associated with it. In some embodiments, messaging results portion 634 includes the name and/or an avatar of the user who transmitted the message and time information associated with the message but does not include any group messaging conversation identifying message (since the message is not associated with a group messaging conversation). In some embodiments, the messages associated with each of the messaging conversation portions 626 and 630, as well as the messages associated with messaging portion 634 have a visual appearance commensurate with how messages are displayed by the messaging application such as illustrated in FIG. 6E. For instance, the messages appear in bubbles to indicate that the search results are text messages. Optionally, the messages are displayed chronologically.

In some embodiments, some or all of the messages associated with a messaging conversation portion appear in a single messaging conversation portion so long as there are no chronologically intervening message results in between the messaging results associated with a particular messaging conversation portion that are associated with another group messaging conversation or non-group messaging conversation. For instance, in the example of FIG. 6C, messages 628*a-c* appear in a single messaging conversation results portion 624 since there are no other message results that are chronologically between the messages associated with messaging conversation. In the example of FIG. 6C, the message results 628*a-c* associated with the "Pizza Crew" group messaging conversation (including messages 616A displayed in FIG. 6B) are all chronologically before the message results associated with the "Foodies" group messaging conversation and the messaging conversation associated with messaging conversation results portion 634. Thus, the search results associated with the "Pizza Crew" group messaging conversation can be included in a single messaging conversation results portion. However, in the event that messaging results associated with a messaging conversation have other messaging results that are chronologically intervening, then optionally the message results associated with a messaging conversation are displayed by the device using multiple messaging conversation portions as illustrated in FIG. 6D.

Figure 6D:
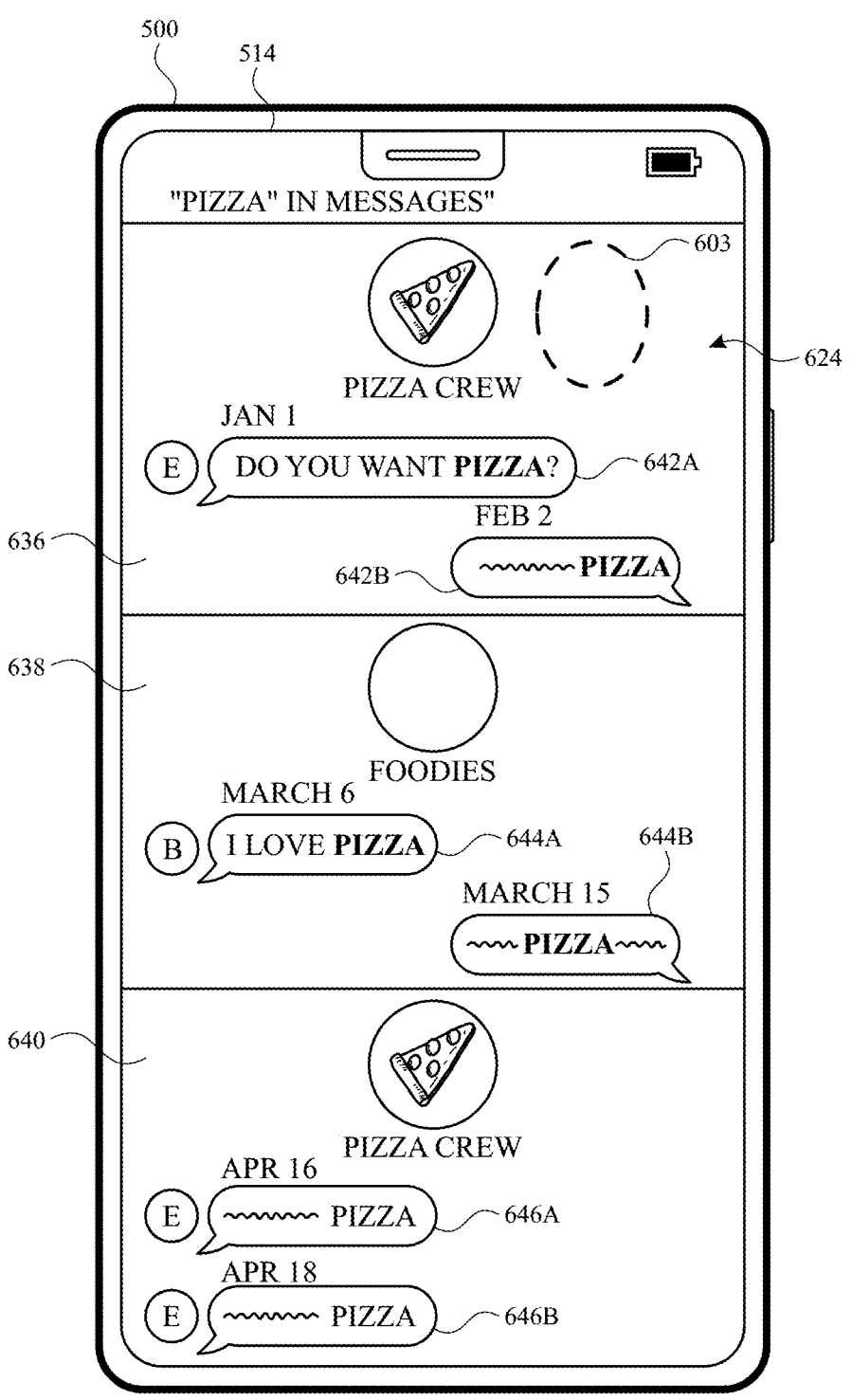
Figure 6E:
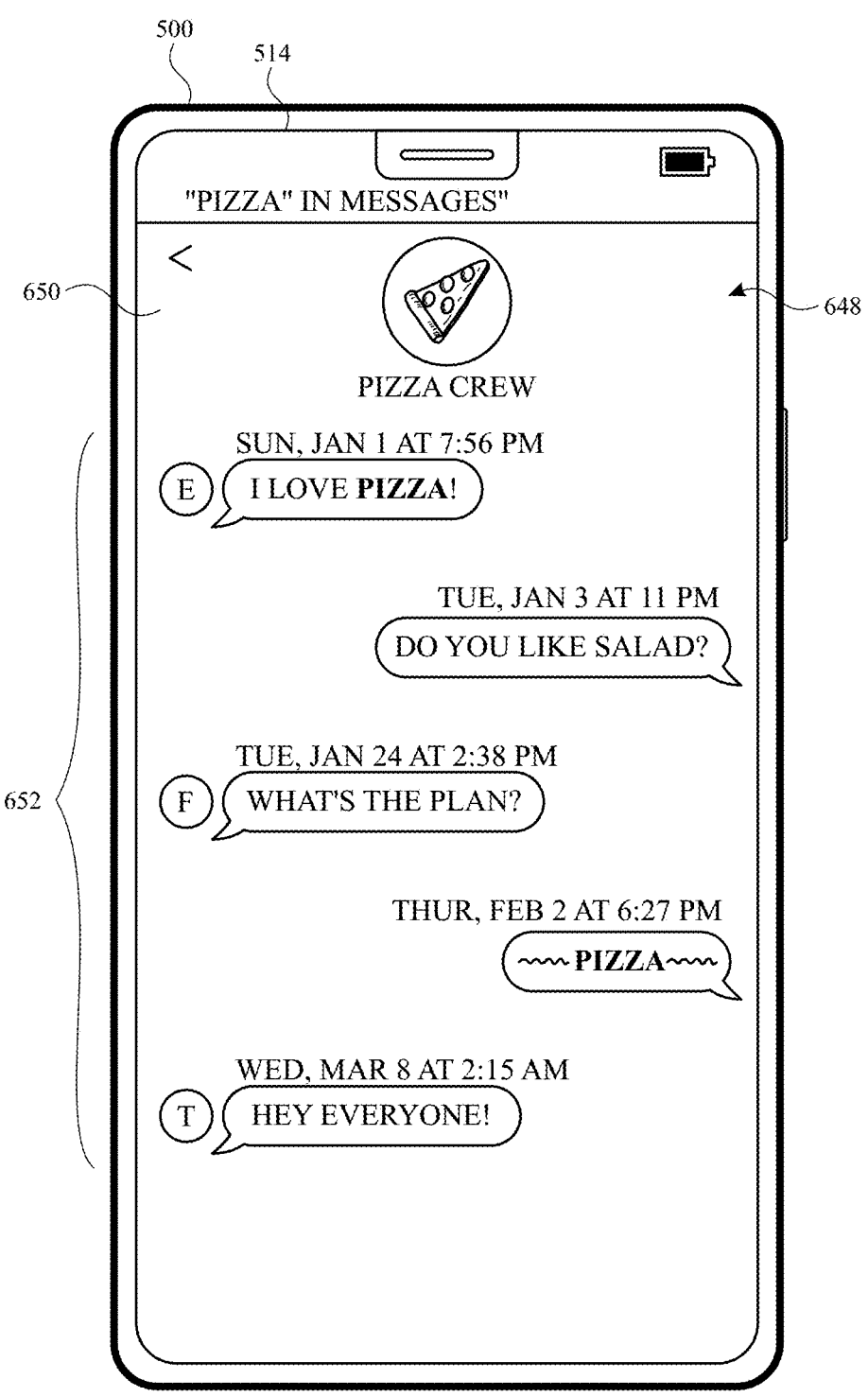

In the example of FIG. 6D, messaging results associated with the "Pizza Crew" group messaging conversation are apportioned into messaging results portion 636 and messaging results portion 640 due to chronologically intervening message results associated with other messaging conversations being part of the messages that are determined to relevant to the search query received by the device. For instance, messages 642*a-b*, which were transmitted on January 1$^{st}$ and February 2$^{nd}$ respectively, are included in messaging conversation results portion 636. Messaging conversation results portion 640 includes the same visual indicators described above with respect to FIG. 6C to delineate the portion 640 from other portions on the expanded search results user interface 624. In some embodiments, messages 644*a* and 644*b* associated with the "Foodies" group messaging conversation are included as part of messaging conversation results portion 638 which is displayed by the device below messaging conversation results portion 636. Messaging conversation results portion 638, which includes messages 644*a* and 644*b* are displayed by the device below messaging conversation results portion 636 since messages 644*a-b* (which are dated on March 6$^{th}$ and March 15$^{th}$ respectively) are chronologically after the messages 642*a-b* that are included as part of messaging conversation results portion 636.

In some embodiments messages 646*a-b* are included as part of a messaging conversation results portion 640 that is separate from messaging conversation results portion 636, even though messages 646*a-b* are associated with the same "Pizza Crew" group messaging conversation as messages 642*a-b*. Messages 646*a-b*, which are dated April 16$^{th}$ and April 18$^{th}$ respectively, are part of a separate messaging conversation results portion because messages 644*a-b* of the "Foodies" group messaging conversation chronologically intervene messages 642*a-b* and messages 646*a-b*. Thus, in some embodiments the messages results 642*a-b*, 644*a-b*, and 644*a-b* associated with the received search query are displayed by the device chronologically and are grouped into messaging conversation portions to indicate that they belong to the same messaging conversation where appropriate.

In some embodiments, each of messaging portions 636, 638, 640 are selectable (e.g., via a tap of contact 603 on portion 636). In response to detecting selection of messaging conversation results portion 636, the device 500 displays a messaging conversation interface 648 for interacting with the message associated with the messaging conversation associated with messaging conversation results portion 636, and/or for interacting with the corresponding messaging conversation (e.g., consuming and/or sending messaging activity to the corresponding messaging conversation), as illustrated at FIG. 6E. In some embodiments, messaging conversation user interface 648 includes some or all of the messages associated with the messaging conversation associated with messaging conversation results portion 636, including messages that are relevant to the received search query, as well as other messages that are not relevant. In some embodiments, messaging conversation user interface 648 includes information portion 650 that includes identifying information (e.g., a name and/or photo) associated with the messaging conversation. Additionally, the messaging conversation user interface 648 includes messages 652 that are associated with the messaging conversation. Optionally, the messages 652 are displayed by the device on messaging conversation user interface 648 chronologically. In some embodiments, the messages that have been determined by the device to be relevant to the received search query include one or more visual indicators (for instance the matching text is bolded) to indicate that the message is part of the search results associated with the received search query. The messages that are not part of the search results are optionally displayed without any visual indicators, thus making them visually distinguishable from messages that are part of the search results, however the messages have the same visual appearance (e.g., a bubble and avatar) as the messages that were part of the search results.

FIG. 7 is a flow diagram illustrating a method 700 of displaying messaging search results at a search results user interface in accordance with some embodiments. The method 700 is optionally performed at an electronic device such as device 100, device 300, or device 500 as described above with reference to FIGS. 1A-1B, 2-3, 4A-4B and 5A-5H. Some operations in method 700 are, optionally, combined and/or order of some operations is, optionally, changed.

As described below, the method 700 provides ways to facilitate efficient display of messaging search results associated with a search of messages in a messaging application. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 700 is performed at an electronic device in communication with a display generation component and one or more input devices. For example, the electronic device is a mobile device (e.g., a tablet, a smartphone, a media player, or a wearable device) including wireless communication circuitry, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc.). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, while displaying, via the display generation component, a search results user interface associated with a messaging application such as in FIG. 6B, (e.g., while displaying a user interface that includes representations of messaging activity that matches a search query received at the electronic device,) the electronic device receives (702a), via the one or more input devices, a first input corresponding to a request to display a plurality of messages associated with a search request, such as the input from contact 603 from FIG. 6B. In some embodiments, a messaging application refers to an application running on the electronic device that enables the user of the device to send and receive messaging activity (e.g., text messages, images, web-links) to and from external users. In some embodiments, in response to receiving a search query (e.g., one or more search criterion such as a word or phrase), the electronic device displays messaging activity that matches the received query on the search results interface. In some embodiments, the search results user interface displays text messages stored on and/or accessible via the electronic device that include the word or phrase associated with the received search query. Additionally or alternatively, the electronic device displays other types of messaging activity that match the received search query including but not limited to photos and web-based links. In some embodiments, the search results displayed by the device at the search results user interface are organized by category of messaging activity. For instance, text messages (e.g., messaging conversations and individual messages) matching a received search query are displayed together at a first portion of the search results user interface. Likewise, photos and/or web-based links matching the received search query are grouped together on a second portion of the search results user interface. In some embodiments, the search results user interface displays a partial list of the messaging activity that matches the received search query. For instance, the device in response to a received search query displays a partial list of the text messages matching the query, a partial list of the photos matching the query, and/or a partial list of the web-based links matching the query. Additionally or alternatively, the search results user interface displays a complete list of the messaging activity that matches the received query. For instance, the device in response to the received search query displays a list of all text messages matching the query, a complete list of the photos matching the query, and/or a complete list of the web-based links matching the query. In some embodiments, receiving the first input at the electronic device corresponds to detecting selection of the first selectable option (e.g., via a tap on a touchscreen at the first selectable option, click on a mouse at first selectable option, and/or a keyboard input).

In some embodiments, in response to receiving the first input, the electronic device displays (702b), via the display generation component, a plurality of representations of the plurality of messages associated with the search request, including: in accordance with a determination that a first message of the plurality of messages and a second message of the plurality of messages satisfy one or more criteria, including a criterion that is satisfied when the first message and the second message are included in a first messaging conversation, the electronic device displays (702c), via the display generation component, a first combined search result user interface element associated with the first messaging conversation that includes a representation of the first message and a representation of the second message such as in FIG. 6C. In some embodiments, in response to receiving the first input (e.g., the device detecting selection of a selectable option to see an expanded list of text messages), the device organizes the expanded list by messaging conversation. For instance, if the first message and the second message match the search query (e.g., criteria), and both the first message and second message belong to the same messaging conversation (e.g., the first messaging conversation), then the device displays a combined search result user interface element that includes both the first and second message. In some embodiments, the device displays multiple combined (or single) search result user interface elements, with each search result user interface element being visually delineated from one another to show where each search result user interface element begins and ends. Optionally, each search result user interface is visually delineated using one or more lines or other visual marker to show where the search result user interface begins and ends. The combined search result user interface includes one or more visual indicators that are configured to visually indicate that the first and second messages are a part of the same messaging conversation. Additionally or alternatively, the combined search result user interface does not include a visual delineation between messages that are part of the same combined search result user interface thereby visually indicating that the messages belong to the same messaging conversation. In some embodiments, the visual indicators include but are not limited to, identifying information (e.g., a name and/or photo) of the messaging conversation. Optionally, each search result user interface includes its own identifying information (e.g., a name and/or photo) to visually indicate that the message(s) within the search result user interface belong to the same messaging conversation. The device displays a combined search result user interface element for each messaging conversation that includes a plurality of messages matching the one or more criteria. Thus, when the device displays multiple combined search result user interface elements on the user interface, each combined search result user interface displays the identifying information (e.g., photo and/or name) associated with the messaging conversation it represents, with each element corresponding to a messaging conversation that includes messages matching the criteria. In some embodiments, the one or more combined search result user interface elements are arranged on the display chronologically. For instance, the search result user interface element containing the oldest messages is displayed first, while the search result user interface element including the newest messages are displayed last. As will be discussed in detail further below, in the event that two separate messaging conversations including matching results that are intervening in time with respect to one another, the combined search result user interface element pertaining to a messaging conversation can be split into multiple parts. Organizing search results by messaging conversation and chronologically provides an efficient and decluttered user interface for viewing messaging search results, thereby minimizing erroneous user input and conserving computing resources and memory resources needed by the device to rectify erroneous user input.

In some embodiments, the search results user interface includes: a first category search results region associated with a first category of content items associated with the search request, and a second category search results region associated with a second category of content items associated with the search request, that includes a representation of the first message and the second message such as in FIG. 6B. In some embodiments, the search results user interface includes one or more category search results regions, with each region pertaining to a specific category of content. For instance, if a particular search yields results in messages and photos, then the results can be displayed by category. Thus, the matching messages are displayed in a "messages" category search results region, while the matching photos are displayed in a "photos" category search results region. In some embodiments, the search results user interface includes a first selectable option that is selectable to display additional content items of the first category of content items that are associated with the search request. In some embodiments, the search results user interface includes a second selectable option that is selectable to display additional content items of the second category of content items that are associated with the search request, and the first input corresponds to selection of the first selectable option such as the input from contact 603 from FIG. 6B. In some embodiments, the category search results region displays a partial listing of the matches to a search query and will not list all of the matches. Optionally, the matches for a particular category that are most relevant or are determined to be the closest matches to the search query are displayed in the category search results region, while less relevant results are not displayed. In some embodiments, each of the category search results regions of the search results user interface include a selectable option to expand the list of respective results so as to include all the results associated with a category. When the device detects selection of the selectable option, the device expands the list of matches from a partial listing to a complete listing of matches. In some embodiments, in response to detecting selection of the selectable option associated with a category search results region, the device ceases to display search results associated with other category search results regions and instead displays a complete list of the search results associated with the category of the category search results region in which the selectable option was selected. Displaying partial search results for each category, rather than a complete list of search results for each category conserves computing and memory resources of the device that would otherwise be used to display complete results for each category of search results.

In some embodiments, the representation of the first message has a first visual appearance, and the representation of the second message has a second visual appearance such as messages 616a and 616b in FIG. 6B, For instance, the first message and the second message when displayed in response to receiving the first input, include one or more visual indicators to indicate that the first message and the second message are distinct messages. For instance, the text or content of each message is displayed inside of a bubble (e.g., having a particular color) in accordance with how messages are displayed in the messaging application. The one or more visual indicators provide the message with a distinct visual appearance that makes each message readily identifiable as being a distinct message.

In some embodiments, the electronic device receives, via the one or more input devices, a second input such as the input contact 603 in FIG. 6D, corresponding to a request to display a messaging user interface including representations of messages included in the first messaging conversation independent of the search request. In some embodiments, the messages matching a particular search query and belonging to the same messaging conversation can be displayed by the device in the same manner (e.g., with the same visual appearance) as they would be displayed on the messaging application. For instance, the matching results from a messaging conversation may be interspersed throughout a messaging conversation (e.g., the matching messages include non-matching messages between them), and thus optionally, the matching message results from the same messaging conversation are displayed along with messages in the messaging conversation that are not part of the search results.

In some embodiments, in response to receiving the second input, the electronic device displays, via the display generation component, the messaging user interface, including: a representation of the first message that has the first visual appearance, and a representation of the second message that has the second visual appearance such as messages 652 in FIG. 6E. In some embodiments, in response to receiving the second input, the device displays a messaging user interface that is configured to display messages in substantially the same manner as messages are displayed in the messaging application (e.g., the user interface that includes the content (e.g., messages) of the messaging conversation that includes the first and second messages). Thus, even though the messages are being displayed in response to a search query, the messages that match a given search query, and are part of the same messaging conversation will be displayed by the messaging application in the same manner that messaging conversations are displayed by the messaging application. For instance, each of the messages—both in response to the first input and/or in the search user interface, and in the user interface of the messaging conversation (e.g., the user interface from which the content of the messaging conversation is displayed and/or from which messaging activity can be added to the conversation by the user)—are displayed in a bubble and are displayed alongside an avatar that provides identifying information about the user that generated and/or transmitted the message to the conversation. Displaying messaging search results in the same manner as messages are displayed by a messaging application allows the user to view the context in which matching messaging results take place, thereby reducing erroneous input at the device, and thereby conserving computing resources and memory resources associated with correcting the erroneous input.

In some embodiments, the representation of the first message having the first visual appearance includes a representation of a user associated with the first message, and the representation of the second message having the second visual appearance includes a representation of a user associated with the second message (optionally the same or different from the user associated with the first message) such as messages 616a and 616b in FIG. 6B. In some embodiments, the visual appearance of the message includes an avatar that is displayed along with the message and is associated with a user that generated the message. The avatar along with the bubble (described above) are examples of visual indicators that make up the visual appearance of a message. In some embodiments, the avatar includes a name associated with the user and/or a photo associated with the user. Displaying an avatar with the matching message search result, allows the user to efficiently identify the source of a matching messaging result, thereby minimizing the amount of input required by the user to view information associated with a matching search result thus conserving computing resources and memory resources of the device.

In some embodiments, the first combined search result user interface element includes identifying information for the first messaging conversation such as combined search result user interface element 626 in FIG. 6C. In some embodiments, the matching search results associated with a messaging conversation are displayed by the device together, and the device visually delineates each group messaging conversation that includes messages that match a search query. In some embodiments, and as part of delineating distinct group messaging conversations on the combined search result user interface, the combined search result user interface includes identifying information associated with the messaging conversation. In some embodiments, each messaging conversation that includes matching search results is displayed on the device as separate combined (or not combined, if only a single message from that conversation matches the search query) search result user interface elements that are visually separated from one another by a visual marker such as a line, and each combined (or not combined) search result user interface element is labeled with identifying information of the messaging conversation using a name and/or photo associated with the messaging conversation. In some embodiments, a given combined search result user interface element is displayed with a single indication of the corresponding messaging conversation, independent of how many representations of messages are included in the given combined search result user interface. Displaying identifying information associated with the group messaging conversation on the combined search result user interface element, allows the user to efficiently identify the source of the matching messaging results, thereby minimizing the amount of input required by the user to view information associated with a matching search result thus conserving computing resources and memory resources of the device.

In some embodiments, the one or more criteria include a criterion that is satisfied when the plurality of messages associated with the search request does not include a respective message that was sent or received at a time that is chronologically between a time when the first message was sent or received and a time when the second message was sent or received such as in FIG. 6C. In some embodiments, matching results (e.g., messages) that are part of the same messaging conversation are displayed together (e.g., in a combined search result element) so long as there are not matching results from other messaging conversations that are chronologically between the messages associated with the messaging conversation. In some embodiments, the matching results associated with a messaging conversation are displayed with other messages of the messaging conversation that are not relevant search results, however the messages will all be displayed together so long as they belong to the same messaging conversation. Displaying matching results by group messaging conversation when there are no chronologically intervening messages that are associated with another group messaging conversation, provides the user with an efficient manner to view matching search results, thereby decreasing the likelihood of erroneous input on the device and conserving computing resources associated with erroneous inputs from a user.

In some embodiments, displaying, via the display generation component, the plurality of representations of the plurality of messages associated with the search request includes: displaying, via the display generation component, a second search result user interface element associated with a second messaging conversation, different from the first messaging conversation, that includes a representation of a third message, wherein the first message, the second message, and the third message are each associated with a time that the messages were sent or received, wherein the first combined search result user interface element and the second search result user interface element are displayed, via the display generation component, such that the first message, the second message, and the third message are displayed in chronological order based on the times that the messages were sent or received, such as in FIG. 6C. In some embodiments, in addition to displaying matching search results grouped by messaging conversation, the device displays matching search results chronologically. Thus, if a first messaging conversation includes matching search results that are earlier in time than matching search results from a second group messaging conversation, then the device displays the first messaging conversation before displaying the second messaging conversation (e.g., the first messaging conversation will be displayed above the second messaging conversation on the display) such as the Pizza Crew and Foodies group messaging conversations in FIG. 6C. In some embodiments the matching results associated with the first messaging conversation will be displayed before the matching results associated with the second messaging conversation, so long as none of the matching results associated with the second messaging conversation are chronologically between any of the matching results associated with the first messaging conversation. Displaying matching search results by messaging conversation and in chronological order, provides the user with an efficient method for viewing and understanding matches to a given search query, thereby minimizing the likelihood of erroneous user input, and thus allowing the device to conserve both computing and memory resources that would otherwise be expended due to erroneous input.

In some embodiments displaying, via the display generation component, the plurality of representations of the plurality of messages associated with the search request includes: in accordance with a determination that the first message of the plurality of messages and the second message of the plurality of messages do not satisfy the one or more criteria because a third message of the plurality of messages is chronologically between the first message and the second message, displaying a first search result user interface element such as search result user interface 636 in FIG. 6D, wherein the first search result user interface element includes the representation of the first message. In some embodiments, the plurality of representations of the plurality of messages associated with the search request includes displaying a second search result user interface element such as search result user interface 638 in FIG. 6D, wherein the second search result user interface element includes the representation of the second message. In some embodiments, the plurality of representations of the plurality of messages associated with the search request includes displaying a third search result user interface element such as search result user interface element 640 in FIG. 6D, wherein the third search result user interface element includes a representation of the third message, wherein the first search result user interface element, the second search result user interface element, and the third search result user interface element are displayed chronologically, and wherein the device forgoes displaying the first combined search result user interface element. In some embodiments, when matching results from a messaging conversation have matching results from other messaging conversations that are chronologically between them, then the device displays the matching results chronologically and does not group messages from the same messaging conversation on a combined search result user interface element. In some embodiments, if there are multiple intervening messages from a second messaging conversation chronologically between two matching results from a first messaging conversation, then the device displays the first matching result of the first messaging conversation in a first search results user interface element, the multiple intervening messages from the second messaging conversation in a combined search result user interface element, and the second message from the first messaging conversation in a second separate search results user interface element. In some embodiments, the search results user interface and the combined search results user interface include the same characteristics described above with respect to the combined search results user interfaces (e.g., each includes the name of the messaging conversation, are delineated from one another, etc.) Separately displaying matching results from the same messaging conversation when there are intervening matching results from other messaging conversations allows for the results of a search query to be displayed chronologically, thus providing the user with efficient access to the most recent results matching a search query. By listing the matching results chronologically, the devices minimizes the amount of input needed to find the most relevant matching results to a search query, and thereby the device preserves computing resources associated the reduced amount of input.

It should be understood that the particular order in which the operations in method 700 have been described is merely exemplary and is not intended to indicate that the described order is the only order in which the operations could be performed. One of ordinary skill in the art would recognize various ways to reorder the operations described herein.

The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIG. 7 are, optionally, implemented by components depicted in FIGS. 1A-1B. For example, receiving operation 702*a* and displaying operation 702*b*, are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology potentially involves the gathering and use of data available from specific and legitimate sources to display content or suggest content for display to users. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information, usage history, handwriting styles, etc.

The present disclosure recognizes that the use of such personal information data in the present technology can be used to the benefit of users. For example, the personal information data can be used to automatically perform operations with respect to searching messages in a messaging application. Accordingly, use of such personal information data enables users to enter fewer inputs to perform an action with respect to displaying and interacting with content. Further, other uses for personal information data that benefit the user are also contemplated by the present disclosure. For instance, user preferences may be used to display messaging search results in a messaging application.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the user is able to configure one or more electronic devices to change the discovery or privacy settings of the electronic device. For example, the user can select a setting that only allows an electronic device to access certain of the user's messages when searching messages in a messaging application.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, search results based on aggregated non-personal information data or a bare minimum amount of personal information, such as the user preferences being handled only on the user's device or other non-personal information.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
at an electronic device in communication with a display generation component and one or more input devices:
while displaying, via the display generation component, a search results user interface associated with a messaging application, receiving, via the one or more input devices, a first input corresponding to a request to display a plurality of messages associated with a search request; and
in response to receiving the first input, displaying, via the display generation component, a plurality of representations of the plurality of messages associated with the search request, including:
in accordance with a determination that a first message of the plurality of messages and a second message of the plurality of messages satisfy one or more criteria, including a criterion that is satisfied when the first message and the second message are included in a first messaging conversation, displaying, via the display generation component, a first combined search result user interface element associated with the first messaging conversation that includes a representation of the first messaging conversation, a representation of the first message and a representation of the second message;
in accordance with a determination that the first message of the plurality of messages and the second message of the plurality of messages fail to satisfy the one or more criteria, displaying, via the display generation component, the first message in a first result user interface element and the second message in a second result user interface element, different from the first result user interface element; and in accordance with a determination that a third message of the plurality of messages associated with the search request is not included in the first messaging conversation, displaying, via the display generation component, a second combined search result user interface element associated with a second messaging conversation, different from the first messaging conversation, that includes a representation of the third message.

2. The method of claim 1, wherein the search results user interface includes:
a first category search results region associated with a first category of content items associated with the search request,
a second category search results region associated with a second category of content items associated with the search request, that includes a representation of the first message and the second message;
a first selectable option that is selectable to display additional content items of the first category of content items that are associated with the search request,
a second selectable option that is selectable to display additional content items of the second category of content items that are associated with the search request, and
the first input corresponds to selection of the first selectable option.

3. The method of claim 1, wherein:
the representation of the first message has a first visual appearance,
the representation of the second message has a second visual appearance, the method further comprising:
receiving, via the one or more input devices, a second input corresponding to a request to display a messaging user interface including representations of messages included in the first messaging conversation independent of the search request; and
in response to receiving the second input, displaying, via the display generation component, the messaging user interface, including:
a representation of the first message that has the first visual appearance; and
a representation of the second message that has the second visual appearance.

4. The method of claim 3, wherein:
the representation of the first message having the first visual appearance includes a representation of a user associated with the first message, and
the representation of the second message having the second visual appearance includes a representation of a user associated with the second message.

5. The method of claim 1, wherein the first combined search result user interface element includes identifying information for the first messaging conversation.

6. The method of claim 1, wherein the one or more criteria include a criterion that is satisfied when the plurality of messages associated with the search request does not include a respective message that was sent or received at a time that is chronologically between a time when the first message was sent or received and a time when the second message was sent or received.

7. The method of claim 1, wherein displaying, via the display generation component, the plurality of representations of the plurality of messages associated with the search request includes:
displaying, via the display generation component, a second search result user interface element associated with a second messaging conversation, different from the first messaging conversation, that includes a representation of a third message, wherein the first message, the second message, and the third message are each associated with a time that the messages were sent or received,
wherein the first combined search result user interface element and the second search result user interface element are displayed, via the display generation component, such that the first message, the second message, and the third message are displayed in chronological order based on times that the messages were sent or received.

8. The method of claim 1, wherein displaying, via the display generation component, the plurality of representations of the plurality of messages associated with the search request includes:
in accordance with a determination that the first message of the plurality of messages and the second message of the plurality of messages do not satisfy the one or more criteria because a third message of the plurality of messages is chronologically between the first message and the second message:
displaying a first search result user interface element, wherein the first search result user interface element includes the representation of the first message;
displaying a second search result user interface element, wherein the second search result user interface element includes the representation of the second message; and
displaying a third search result user interface element, wherein the third search result user interface element includes a representation of the third message, wherein the first search result user interface element, the second search result user interface element, and the third search result user interface element are displayed chronologically, and wherein the electronic device forgoes displaying the first combined search result user interface element.

9. An electronic device that is in communication with a display generation component and one or more input devices, the electronic device comprising:
one or more processors;
memory; and
one or more programs, wherein the one or more programs are stored in the memory and configured to be executed by the one or more processors, the one or more programs including instructions for:
while displaying, via the display generation component, a search results user interface associated with a messaging application, receiving, via the one or more input devices, a first input corresponding to a request to display a plurality of messages associated with a search request; and
in response to receiving the first input, displaying, via the display generation component, a plurality of representations of the plurality of messages associated with the search request, including:
in accordance with a determination that a first message of the plurality of messages and a second message of the plurality of messages satisfy one or more criteria, including a criterion that is satisfied when the first message and the second message are included in a first messaging conversation, displaying, via the display generation component, a first combined search result user interface element associated with the first messaging conversation that includes a representation of the first messaging conversation, a representation of the first message and a representation of the second message;
in accordance with a determination that the first message of the plurality of messages and the second message of the plurality of messages fail to satisfy the one or more criteria, displaying, via the display generation component, the first message in a first result user interface element and the second message in a second result user interface element, different from the first result user interface element; and
in accordance with a determination that a third message of the plurality of messages associated with the search request is not included in the first messaging conversation, displaying, via the display generation component, a second combined search result user interface element associated with a second messaging conversation, different from the first messaging conversation, that includes a representation of the third message.

10. The electronic device of claim 9, wherein the search results user interface includes:
a first category search results region associated with a first category of content items associated with the search request,
a second category search results region associated with a second category of content items associated with the search request, that includes a representation of the first message and the second message;
a first selectable option that is selectable to display additional content items of the first category of content items that are associated with the search request,
a second selectable option that is selectable to display additional content items of the second category of content items that are associated with the search request, and
the first input corresponds to selection of the first selectable option.

11. The electronic device of claim 9, wherein:
the representation of the first message has a first visual appearance,
the representation of the second message has a second visual appearance, wherein the one or more programs further include instructions for:
receiving, via the one or more input devices, a second input corresponding to a request to display a messaging user interface including representations of messages included in the first messaging conversation independent of the search request; and
in response to receiving the second input, displaying, via the display generation component, the messaging user interface, including:
a representation of the first message that has the first visual appearance; and
a representation of the second message that has the second visual appearance.

12. The electronic device of claim 9, wherein displaying, via the display generation component, the plurality of representations of the plurality of messages associated with the search request includes:
displaying, via the display generation component, a second search result user interface element associated with a second messaging conversation, different from the first messaging conversation, that includes a representation of a third message, wherein the first message, the second message, and the third message are each associated with a time that the messages were sent or received, wherein the first combined search result user interface element and the second search result user interface element are displayed, via the display generation component, such that the first message, the second message, and the third message are displayed in chronological order based on times that the messages were sent or received.

13. A non-transitory computer readable storage medium storing one or more programs, the one or more programs comprising instructions, which when executed by one or more processors of an electronic device, cause the electronic device to perform a method comprising:

while displaying, via a display generation component, a search results user interface associated with a messaging application, receiving, via one or more input devices, a first input corresponding to a request to display a plurality of messages associated with a search request; and in response to receiving the first input, displaying, via the display generation component, a plurality of representations of the plurality of messages associated with the search request, including:

in accordance with a determination that a first message of the plurality of messages and a second message of the plurality of messages satisfy one or more criteria, including a criterion that is satisfied when the first message and the second message are included in a first messaging conversation, displaying, via the display generation component, a first combined search result user interface element associated with the first messaging conversation that includes a representation of the first messaging conversation, a representation of the first message and a representation of the second message;

in accordance with a determination that the first message of the plurality of messages and the second message of the plurality of messages fail to satisfy the one or more criteria, displaying, via the display generation component, the first message in a first result user interface element and the second message in a second result user interface element, different from the first result user interface element; and in accordance with a determination that a third message of the plurality of messages associated with the search request is not included in the first messaging conversation, displaying, via the display generation component, a second combined search result user interface element associated with a second messaging conversation, different from the first messaging conversation, that includes a representation of the third message.

14. The non-transitory computer readable storage medium of claim 13, wherein the search results user interface includes:

a first category search results region associated with a first category of content items associated with the search request, a second category search results region associated with a second category of content items associated with the search request, that includes a representation of the first message and the second message;

a first selectable option that is selectable to display additional content items of the first category of content items that are associated with the search request, a second selectable option that is selectable to display additional content items of the second category of content items that are associated with the search request, and the first input corresponds to selection of the first selectable option.

15. The non-transitory computer readable storage medium of claim 10, wherein:

the representation of the first message has a first visual appearance, the representation of the second message has a second visual appearance, the method further comprising:

receiving, via one or more input devices, a second input corresponding to a request to display a messaging user interface including representations of messages included in the first messaging conversation independent of the search request; and in response to receiving the second input, displaying, via the display generation component, the messaging user interface, including:

a representation of the first message that has the first visual appearance; and a representation of the second message that has the second visual appearance.

16. The non-transitory computer readable storage medium of claim 13, wherein displaying, via the display generation component, the plurality of representations of the plurality of messages associated with the search request includes:

displaying, via the display generation component, a second search result user interface element associated with a second messaging conversation, different from the first messaging conversation, that includes a representation of a third message, wherein the first message, the second message, and the third message are each associated with a time that the messages were sent or received, wherein the first combined search result user interface element and the second search result user interface element are displayed, via the display generation component, such that the first message, the second message, and the third message are displayed in chronological order based on times that the messages were sent or received.

* * * * *